(12) United States Patent
Matono et al.

(10) Patent No.: US 7,874,063 B2
(45) Date of Patent: Jan. 25, 2011

(54) THIN FILM MAGNETIC HEAD INTEGRATED STRUCTURE

(75) Inventors: Naoto Matono, Saku (JP); Yoshihiko Koyama, Saku (JP); Tatsuya Harada, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 741 days.

(21) Appl. No.: 11/507,538

(22) Filed: Aug. 22, 2006

(65) Prior Publication Data

US 2007/0044297 A1    Mar. 1, 2007

(30) Foreign Application Priority Data

Aug. 23, 2005  (JP) ............................ 2005-241841

(51) Int. Cl.
G11C 5/12     (2006.01)
G11B 5/1455   (2006.01)

(52) U.S. Cl. .................... 29/737; 29/603.09; 29/603.05; 451/5; 451/8; 360/317

(58) Field of Classification Search .............. 29/603.05, 29/603.1, 603.12, 603.15, 603.17, 603.19, 29/737, 729, 603.09; 451/5, 8, 28, 57; 360/316, 360/317, 322

See application file for complete search history.

(56) References Cited

U.S. PATENT DOCUMENTS

| 4,914,868 A |   | 4/1990  | Church et al. |
|---|---|---|---|
| 6,347,983 B1 | * | 2/2002  | Hao et al. .............. 29/603.1 X |
| 6,884,148 B1 | * | 4/2005  | Dovek et al. ................... 451/5 |
| 2002/0173227 A1 | * | 11/2002 | Lam et al. ...................... 451/5 |

FOREIGN PATENT DOCUMENTS

| JP | A-60-108267 | 6/1985 |
|---|---|---|
| JP | A-02-095572 | 4/1990 |
| JP | A-04-030314 | 2/1992 |
| JP | A-08-249636 | 9/1996 |
| JP | A-11-000863 | 6/1999 |
| JP | A-2000-067408 | 3/2000 |
| JP | 2004241087 A * | 8/2004 |
| JP | A-2005-317069 | 11/2005 |
| JP | A-2006-048806 | 2/2006 |
| JP | A-2006-073088 | 3/2006 |
| JP | A-2006-209905 | 8/2006 |

* cited by examiner

*Primary Examiner*—A. Dexter Tugbang
(74) *Attorney, Agent, or Firm*—Oliff & Berridge, PLC

(57) ABSTRACT

A thin film magnetic head integrated structure is provided. A plurality of thin film magnetic head bars include a plurality of thin film magnetic head precursors, a plurality of RLG sensors for read head core, and a plurality of RLG sensors for write head core, the read head core including a magnetoresistive element that performs a read process and the write head core including a magnetic pole layer that performs a write process.

7 Claims, 26 Drawing Sheets

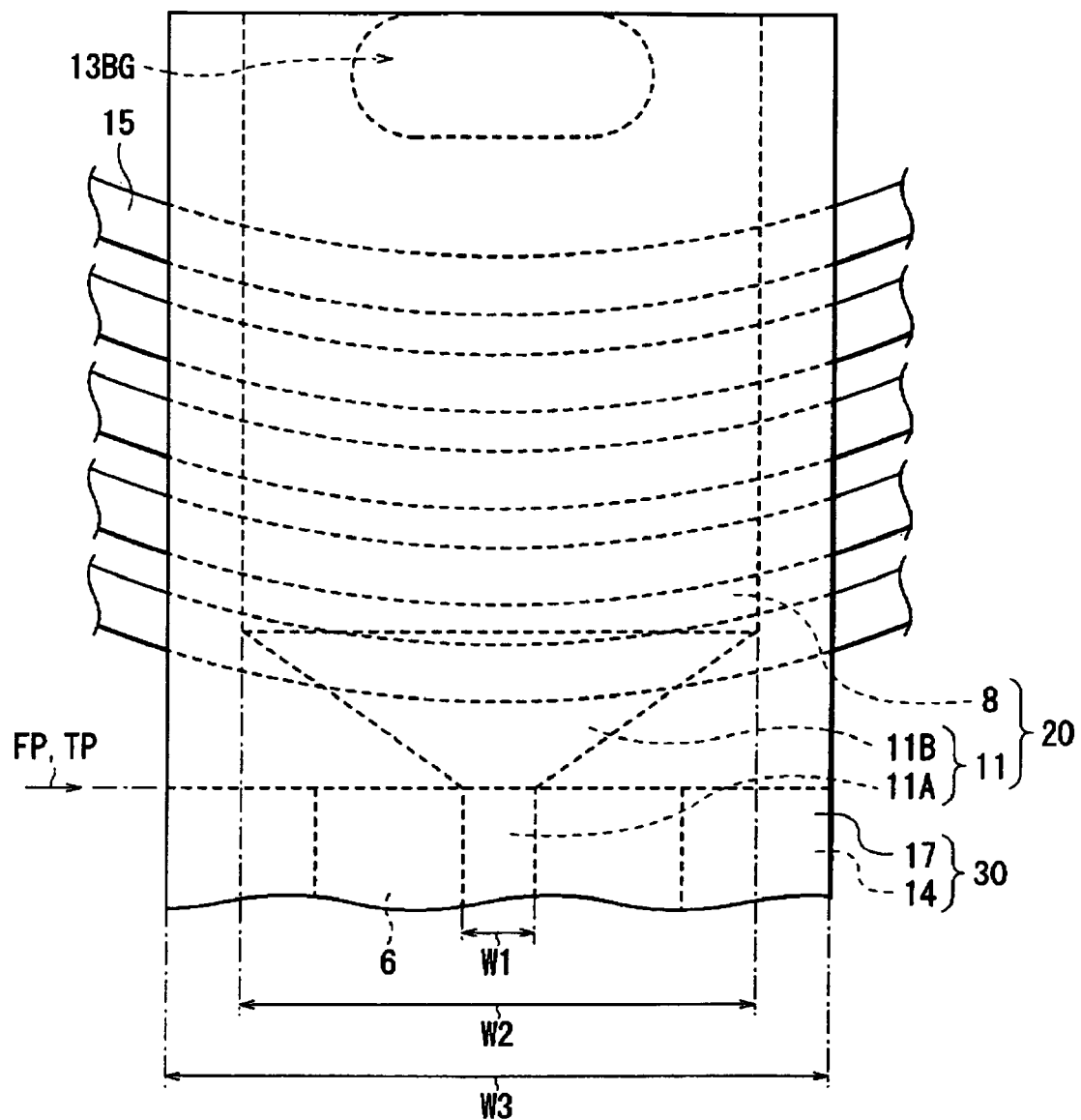
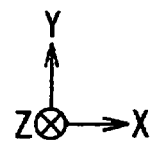
FIG. 7

THIN FILM MAGNETIC HEAD INTEGRATED STRUCTURE

BACKGROUND OF THE INVENTION

1. Field of the Invention

The present invention relates to a thin film magnetic head integrated structure used for manufacturing a thin film magnetic head having at least an inductive magnetic transducer for writing, and a method of manufacturing the thin film magnetic head integrated structure, as well as a method of manufacturing a thin film magnetic head using the thin film magnetic head integrated structure.

2. Description of the Related Art

Recently, an improvement in the surface recording density of a magnetic recording medium (hereinafter referred to simply as a "recording medium"), such as a hard disk, requires an improvement in the performance of a thin film magnetic head mounted on a magnetic recording device such as a hard disk drive (HDD). As a recording system of the thin film magnetic head, there are known a longitudinal recording system that sets the direction of a signal magnetic field to the inplane direction (the longitudinal direction) of a recording medium, and a perpendicular recording system that sets the direction of a signal magnetic field to a direction orthogonal to a surface of a recording medium. At the present, the longitudinal recording system is widely used. However, in consideration of a market trend along with an improvement in the surface recording density of a recording medium, the perpendicular recording system seems more favorable than the longitudinal recording system in the future. This is because the perpendicular recording system has the advantage that a high linear recording density can be ensured and a recording medium after recording is less susceptible to the influence of thermal fluctuation.

A thin film magnetic head of perpendicular recording system includes mainly a thin film coil that generates a magnetic flux, and a magnetic pole layer that extends from an air bearing surface to the rear and performs a write process by emitting a magnetic flux generated in the thin film coil toward a recording medium. The magnetic pole layer includes a track-width-defining part of a width (a uniform width) that defines a write track width. The height of the track-width-defining part, namely the size from the front end (the edge exposed on the air bearing surface) to the rear end (a so-called flare point), is a neck height that is an important factor contributing to the write performance of the thin film magnetic head. In the thin film magnetic head of perpendicular recording system, when a magnetic flux for writing is generated by energization of the thin film coil, the magnetic flux is emitted from the tip of the track-width-defining part in the magnetic pole layer, so that a magnetic field (a vertical magnetic field) for writing is generated and the surface of the recording medium is magnetized by the vertical magnetic field. This enables information to be written magnetically on the recording medium.

As a thin film magnetic head of this type, there has recently been spread a composite-type thin film magnetic head (hereinafter referred to simply as a "composite thin film magnetic head), which functions to perform not only a write process with respect to a recording medium (write magnetically information on the recording medium), but also a read process with respect to the recording medium (read magnetically the information written in the recording medium). For example, the composite thin film magnetic head is provided with both of a write head core that performs the write process of the above-mentioned perpendicular recording system, and a read head core that performs the read process by using magneto-resistive effect (MR). The read head core contains an MR element extending from an air bearing surface to the rear, as the executing body of the read process. The height of the MR element, namely the size from the front end of the MR element (the edge exposed on the air bearing surface) to the rear end (the edge far from the air bearing surface), is an MR height that is an important factor contributing to the read performance of the thin film magnetic head.

For the purpose of a batch manufacturing of a plurality of composite thin film magnetic heads, the composite thin film magnetic heads are generally manufactured by using a thin film magnetic head integrated structure that a plurality of thin film magnetic head precursors are disposed on a wafer. The thin film magnetic head precursors are preformed bodies for forming thin film magnetic heads, and arranged in a plurality of rows on the wafer. In particular, the thin film magnetic head precursors have the same configuration as the completed composite thin film magnetic head including the read head core and the write head core, except for the absence of an air bearing surface.

In the manufacturing process of the composite thin film magnetic head, thin film magnetic heads are completed by the steps of: forming a plurality of thin film magnetic head bars by cutting the thin film magnetic head integrated structure along the direction of arrangement of the thin film magnetic head precursors; and forming an air bearing surface by grinding one end surface of each of the thin film magnetic head bars (a cut surface formed after cutting the thin film magnetic head integrated structure) until the after-polishing sizes of a read head core and a write head core become their respective predetermined sizes, more specifically, until the MR height of the read head core has a predetermined size and the neck height of the write head core has a predetermined size. Thereafter, the thin film magnetic head bars with the air bearing surface formed thereon are cut per thin film magnetic head, resulting in a plurality of magnetic head sliders.

With regard to the above-mentioned manufacturing process of the composite thin film magnetic heads, several techniques have been proposed to control the progress of a grinding process in the grinding step for forming the air bearing surface. For example, there is known a technique of forming, in the step of forming thin film magnetic head precursors, dummy sensors for monitoring within the thin film magnetic head precursors, and then performing the grinding process while measuring the MR height on the dummy sensors (refer to, for example, Japanese Unexamined Patent Publication No. 11-000863). There is also known the technique of performing the grinding process while measuring the electrical resistance values of MR elements in a plurality of thin film magnetic head precursors and calculating an average value of the electrical resistance values, instead of measuring the MR height (refer to, for example, Japanese Unexamined Patent Publication No. 02-095572). Both of the above techniques are capable of controlling the amount of grinding so that the MR height has a predetermined size.

SUMMARY OF THE INVENTION

In order to ensure the operational performance of the composite thin film magnetic head, it is necessary to determine with high precision both of the neck height contributing to write performance and the MR height contributing to read performance. The conventional method of manufacturing the composite thin film magnetic heads controls the progress of the grinding process in order to determine the MR height so as to be a predetermined size in the plurality of thin film magnetic head precursors when grinding the thin film magnetic head bar. However, this method does not control the progress of the grinding process in order to determine the neck height so as to be a predetermined size in the plurality of thin film magnetic head precursors. Consequently, there is still room for improvement in terms of determining with high precision both of the MR height and the neck height. Hence, there is a demand for a technique of manufacturing the composite thin film magnetic heads with which both of the MR height and the neck height can be determined with high precision in the grinding step for forming the air bearing surface. Thus, in order to establish a manufacturing technique of the above-mentioned composite thin film magnetic head, it is also important to establish a thin film magnetic head integrated structure and a method of manufacturing thereof that are used for this manufacturing technique.

In view of foregoing, it is desirable to provide a thin film magnetic head integrated structure that can contribute to high-precision determinations of both of the MR height and the neck height, and a method of manufacturing thereof.

It also desirable to provide a method of manufacturing a thin film magnetic head that enables both of the MR height and the neck height to be determined with high precision.

According to an embodiment of the present invention, there is provided a thin film magnetic head integrated structure including, on one surface of a substrate,: a plurality of thin film magnetic head precursors each having a read head core and a write head core stacked one upon another, being provided previous to formation of a plurality of thin film magnetic heads each including the read head core and the write head core and each having an air bearing surface; a plurality of resistive film sensors for read head core, arranged in the same layer as the read head core, and used to control a grinding progress on the read head core when finishing the thin film magnetic heads by grinding the thin film magnetic head precursors from a grinding start surface position to the air bearing surface position; and a plurality of resistive film sensors for write head core, arranged in the same layer as the write head core, and used to control a grinding progress on the write head core when finishing the thin film magnetic heads by grinding the thin film magnetic head precursors from a grinding start surface position to the air bearing surface position. Each of the resistive film sensors for read head core and each of the resistive film sensors for write head core include a first resistive film pattern positioned near the grinding start surface position, and at least one of them includes a second resistive film pattern positioned far from the grinding start surface position.

According to an embodiment of the present invention, there is provided a method of manufacturing a thin film magnetic head integrated structure including, on one surface of a substrate,: a first step of forming a plurality of thin film magnetic head precursors each including a read head core and a write head core stacked one upon another, previous to formation of a plurality of thin film magnetic heads each including the read head core and the write head core and each having an air bearing surface; a second step of forming a plurality of resistive film sensors for read head core in the same layer as the read head core so that a grinding progress can be controlled when finishing the thin film magnetic heads by grinding the thin film magnetic head precursors from a grinding start surface position to the air bearing surface position; and a third step of forming a plurality of resistive film sensors for write head core in the same layer as the write head core so that a grinding progress can be controlled when finishing the thin film magnetic heads by grinding the thin film magnetic head precursors from a grinding start surface position to the air bearing surface position. In the second step and the third step, the resistive film sensors for read head core and the resistive film sensors for write head core are formed, respectively, so that each of the resistive film sensors for read head core and each of the resistive film sensors for write head core include a first resistive film pattern positioned near the grinding start surface position, and at least one of them includes a second resistive film pattern positioned far from the grinding start surface position.

In the thin film magnetic integrated structure or the method of manufacturing the thin film magnetic integrated structure of an embodiment of the present invention, there are formed the plurality of resistive film sensors for read head core disposed in the same layer as the read head core, and the plurality of resistive film sensors for write head core disposed in the same layer as the write head core. The former and the latter include the first resistive film pattern positioned near the grinding start surface position, and at least one of the former and the latter includes the second resistive pattern positioned far from the grinding start surface position.

A method of manufacturing a thin film magnetic head of an embodiment of the present invention is directed to the manufacturing of a plurality of thin film magnetic heads each having read head core and a write head core stacked one upon another and having an air bearing surface, by using the above-mentioned thin film magnetic head integrated structure. The method includes: a first step of cutting the thin film magnetic head integrated structure along a direction of arrangement of the plurality of thin film magnetic head precursors, thereby forming a plurality of thin film magnetic head bars including a plurality of thin film magnetic head precursors, a plurality of resistive film sensors for read head core, and a plurality of resistive film sensors for write head core; and a second step of detecting first electrical resistance values and second electrical resistance values, and grinding the thin film magnetic head precursors in the thin film magnetic head bars from the grinding start surface position to the air bearing surface position while controlling a grinding progress based on the first electrical resistance values and the second electrical resistance values. The first electrical resistance values are values in the first resistive film patterns in either the plurality of resistive film sensors for read head core or the plurality of resistive film sensors for write head core, or values in the second resistive film patterns in either the plurality of resistive film sensors for read head core or the plurality of resistive film sensors for write head core. The second electrical resistance values are values in the first resistive film patterns in both of the plurality of resistive film sensors for read head core and the plurality of resistive film sensors for read head core.

In the method of manufacturing a thin film magnetic head of an embodiment of the present invention, by cutting the thin film magnetic head integrated structure along the direction of arrangement of the plurality of thin film magnetic head precursors, the plurality of thin film magnetic head bars are formed so as to include the plurality of thin film magnetic head precursors, the plurality of resistive film sensors for read head core disposed in the same layer as the read head core, and the plurality of resistive film sensors for write head core disposed in the same layer as the write head core. Thereafter, the first electric resistance values in the first resistive film patterns in either the plurality of resistive film sensors for read head core or the plurality of resistive film sensors for write head core, or values in the second resistive film patterns in either the plurality of resistive film sensors for read head core or the plurality of resistive film sensors for write head core are detected. While controlling the grinding progress based on the first and second electrical resistance values, the thin film magnetic head precursors are ground from the grinding start surface position to the air bearing surface position, resulting in the plurality of thin film magnetic heads. Thus, in the procedure of forming the air bearing surface by the grinding process, the grinding progress of the read head core and that to the write head core are properly controlled to achieve the desired size of the MR height of the read head core and the desired size of the neck height of the write head core.

In the thin film magnetic head integrated structure of an embodiment of the present invention, it is preferable that the first resistive film pattern and the second resistive film pattern are arranged so as to be partially adjacent to each other.

Alternatively, the resistive film sensors for read head core and the resistive film sensors for write head core may include both of the first resistive film pattern and the second resistive film pattern.

Alternatively, the resistive film sensors for read head core may include both of the first resistive film pattern and the second resistive film pattern, and the resistive film sensors for write head core may include only the first resistive film pattern.

Alternatively, the resistive film sensors for read head core may include only the first resistive film pattern, and the resistive film sensors for write head core may include both of the first resistive film pattern and the second resistive film pattern.

In the above cases, the resistive film sensors for read head core and the resistive film sensors for write head core are used to detect an amount of grinding of the read head core and an amount of grinding of the write head core, based on changes in electrical resistance values responsive to the amount of grinding.

Preferably, in the thin film magnetic head integrated structure of an embodiment of the present invention, the plurality of thin film magnetic head precursors are arranged in a plurality of columns, and the resistive film sensors for read head core and the resistive film sensors for write head core are arranged in a plurality of columns corresponding to a direction of arrangement of the plurality of thin film magnetic head precursors.

Alternatively, the thin film magnetic head precursors may be arranged in a first region, and the resistive film sensors for read head core and the resistive film sensors for write head core may be arranged in a second region different from the first region.

Alternatively, the read head core may have a laminate structure including a magnetoresistive element that performs a read process, and the write head core may have a laminate structure including a magnetic pole layer that performs a write process by a track-width-defining part for defining a write track width, and the resistive film sensors for read head core and the resistive film sensors for write head core may be arranged in the same layer as the magnetoresistive element and the magnetic pole layer.

In the above cases, the resistive film sensors for read head core and the resistive film sensors for write head core are used to detect an amount of grinding of the read head core and an amount of grinding of the write head core so that the magnetoresistive element and the track-width-defining part reach predetermined sizes, respectively.

Alternatively, the magnetic pole layer may perform a perpendicular write process.

In the method of manufacturing a thin film magnetic head of an embodiment of the present invention, in the first step, the thin film magnetic head precursors are formed so that the read head core has a laminate structure including a magnetoresistive element that performs a read process, and the write head core has a laminate structure including a magnetic pole layer that performs a write process by a track-width-defining part for defining a write track width. In the second step, the resistive film sensors for read head core are formed so as to be arranged in the same layer as the magnetoresistive element. In the third step, the resistive film sensors for write head core are formed so as to be arranged in the same layer as the magnetic pole layer.

Preferably, in the second step, the resistive film sensors for read head core are formed in parallel with the magnetoresistive element, and in the third step, the resistive film sensors for write head core are formed in parallel with the magnetic pole layer.

In particular, the third step include the steps of: forming a seed layer; forming the magnetic pole layer patterned and a dummy pattern layer, the dummy pattern layer to be used for forming the resistive film sensors for write head core, by selectively growing a plating film on the seed layer; selectively etching the seed layer by using the magnetic pole layer patterned and the dummy pattern layer as a mask, thereby removing the seed layer in region other than the magnetic pole layer patterned and the dummy pattern layer; and exposing the seed layer by removing the dummy pattern layer thereon, thereby finishing the resistive film sensors for write head core, configured of the seed layer exposed.

In the method of manufacturing a thin film magnetic head of an embodiment of the present invention, the thin film magnetic head bars are ground while monitoring the amount of grinding based on changes in the first electrical resistance values and the second electrical resistance values.

Preferably, there are used the first resistive film pattern and the second resistive film pattern in which change rates in the first electrical resistance values and change rates in the second electrical resistance values with respect to an amount of grinding are shifted from a relatively small first change rate to a relatively large second change in a grinding step, the first electrical resistance values and the second electrical resistance values are detected when change rates in the first electrical resistance values and change rates in the second electrical resistance values are shifted to the second change rates.

In the method of manufacturing a thin film magnetic head of an embodiment of the present invention, the first step uses the thin film magnetic head precursors in which the read head core has a laminate structure including a magnetoresistive element that performs a read process, and the write head core has a laminate structure including a magnetic pole layer that performs a write process by a track-width-defining part for defining a write track width. The second step grinds, based on the first electrical resistance values and the second electrical resistance values, the read head core so that the magnetoresistive element reaches a predetermined size, and grinds the write head core so that the track-width-defining part of the magnetic pole layer reaches a predetermined size.

Preferably, the second step includes the steps of: pre-grinding the thin film magnetic head bars until a size of the magnetoresistive element reaches a pre-size larger than the desired size, based on the electrical resistance values of the first resistive film patterns in either the plurality of resistive film sensors for read head core or the plurality of resistive film sensors for write head core; adjusting an inclination of a grinding surface of each of the thin film magnetic head bars while maintaining the pre-size, based on the second electrical resistance values; and performing a finish-polishing of the thin film magnetic head bars until a size of the magnetoresistive element is changed from the pre-size to the desired size, based on the electrical resistance values of the second resistive film patterns in either the plurality of resistive film sensors for read head core or the plurality of resistive film sensors for write head core.

According to the thin film magnetic head integrated structure or the method of manufacturing the thin film magnetic head integrated structure of an embodiment of the present invention, in the plurality of resistive film sensors for read head core disposed in the same layer as the read head core, and the plurality of resistive film sensors for write head core disposed in the same layer as the write head core, each of the former and the latter includes the first resistive film pattern positioned near the grinding start surface position, and at least one of them includes the second resistant film pattern positioned far from the grinding start surface position. Thus, the manufacturing the thin film magnetic head by using the above-mentioned thin film magnetic head integrated structure contributes to high-precision determinations of both of the MR height and the neck height.

According to the method of manufacturing a thin film magnetic head of an embodiment of the present invention, by cutting the thin film magnetic head integrated structure along the direction of arrangement of the plurality of thin film magnetic head precursors, the plurality of thin film magnetic head bars are formed so as to include the plurality of thin film magnetic head precursors, the plurality of resistive film sensors for read head core disposed in the same layer as the read head core, and the plurality of resistive film sensors for write head core disposed in the same layer as the write head core. Thereafter, first electrical resistance values and second electrical resistance values are detected, and the thin film magnetic head precursors in the thin film magnetic head bars are ground from the grinding start position to the air bearing surface position while controlling a grinding progress based on the first and the second electrical resistance values. The first electrical resistance values are values in the first resistive film patterns in either the plurality of resistive film sensors for read head core or the plurality of resistive film sensors for write head core, or values in the second resistive film patterns in either the plurality of resistive film sensors for read head core or the plurality of resistive film sensors for write head core. The second electrical resistance values are values in the first resistive film patterns in both of the plurality of resistive film sensors for read head core and the plurality of resistive film sensors for write head core. Thus, in the procedure of forming the air bearing surface by the grinding process, the grinding progress of the read head core and that to the write head core are properly controlled to achieve the desired size of the MR height of the read head core and the desired size of the neck height of the write head core.

Other and further objects, features and advantages of the invention will appear more fully from the following description.

BRIEF DESCRIPTION OF THE DRAWINGS

FIG. 7 is a plan view illustrating a planar configuration (a planar configuration when viewed from the Z-axis direction) of the planar configuration of the laminate structure in FIG. 5;

DESCRIPTION OF THE PREFERRED EMBODIMENTS

Preferred embodiments of the present invention will now be described in detail with reference to the accompanying drawings.

Figure 1:
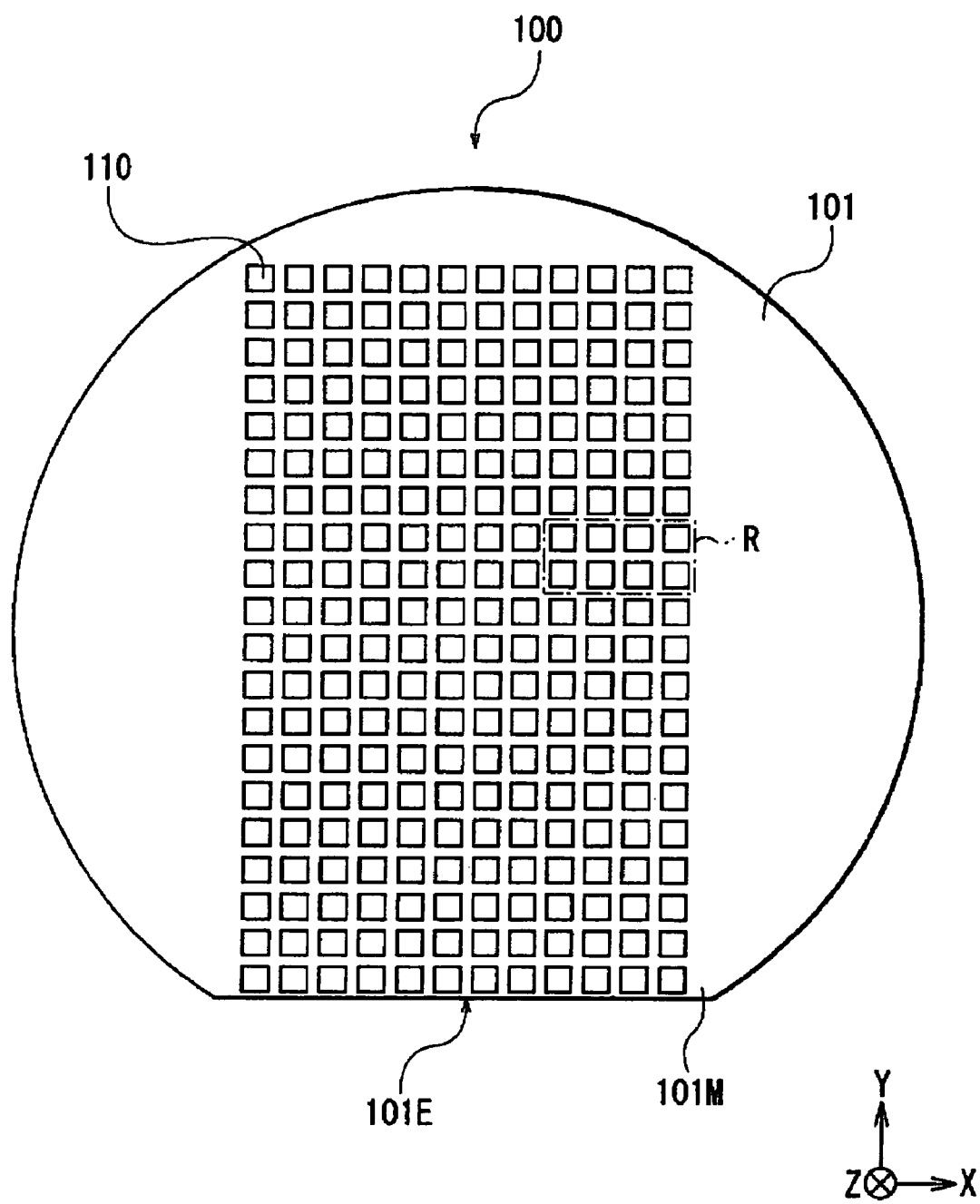
FIG. 1 is a plan view illustrating a planer configuration (a planar configuration when viewed from the Z-axis direction) of a thin film magnetic head integrated structure according to a first embodiment of the present invention.

The configuration of a thin film magnetic head integrated structure according to an embodiment of the present invention will be first described with reference to FIG. 1. FIG. 1 illustrates a planar configuration (a planar configuration when viewed from the Z-axis direction) of a thin film magnetic head integrated structure 100.

In the following description, the size in the X-axis direction illustrated in FIG. 1 is expressed by "width," the size in the Y-axis direction is expressed by "height or length," and the size in the Z-axis direction is expressed by "thickness." In the Y-axis direction, the side close to a later-described air bearing surface (strictly speaking, the side close to a side that becomes the air bearing surface) is expressed by "front," and the opposite side (the side far from the side that becomes the air bearing surface) is expressed by "rear." These expressions are true for FIG. 2 and later drawings.

The thin film magnetic head integrated structure 100 of the embodiment is used to manufacture a thin film magnetic head that is mounted on a magnetic recording device such as a hard disk drive (HDD). More specifically, it is used to manufacture a plurality of composite thin film magnetic heads (hereinafter referred to simply as "thin film magnetic heads"), each having a read head core and a write head core that are stacked one upon another and the air bearing surface.

For example, as shown in FIG. 1, the thin film magnetic head integrated structure 100 has a plurality of thin film magnetic head precursors 110 including a read head core and a write head core, later-described two types of resistance lapping guide (RLG) sensors (RLG sensors 200 for read head core and RLG sensors 300 for write head core, refer to FIG. 2), and a later-described M sensor 400 (refer to FIG. 3) on one surface of a wafer 101 (an element forming surface 101M). FIG. 1 illustrates schematically by simplifying the plurality of thin film magnetic head precursors 110.

The wafer 101 is a substrate for supporting the plurality of thin film magnetic precursors 110, and is formed of a ceramic material such as altic ($Al_2O_3.TiC$). For example, the wafer 101 has a substantially disc-like structure provided with a linear part (an orientation flat 101E) for detecting the direction at a portion of its periphery.

The thin film magnetic head precursors 110 are arranged in a plurality of rows on the element forming surface 101M of the wafer 101. More specifically, the thin film magnetic head precursors 110 are arranged in a matrix-shape along the orientation flat 101E, in order that the portions where the thin film magnetic head precursors 110 are disposed in the wafer 101 can efficiently be separated and cut, for example, when cutting the wafer 101 in a later-described method of manufacturing a thin film magnetic head (refer to FIG. 15). FIG. 1 illustrates, for example, the case of arranging the plurality of thin film magnetic head precursors 110 in an array of 12 rows and 20 columns. The term "column" means the arrangement of the thin film magnetic head precursors 110 along the lateral direction (the X-axis direction), and the term "row" means the arrangement of the thin film magnetic head precursors 110 along the vertical direction (the Y-axis direction). The above-mentioned arrangement of the thin film magnetic head precursors 110 is for purposes of illustration only and is not necessarily limited to 12 rows and 20 columns.

Figure 3:
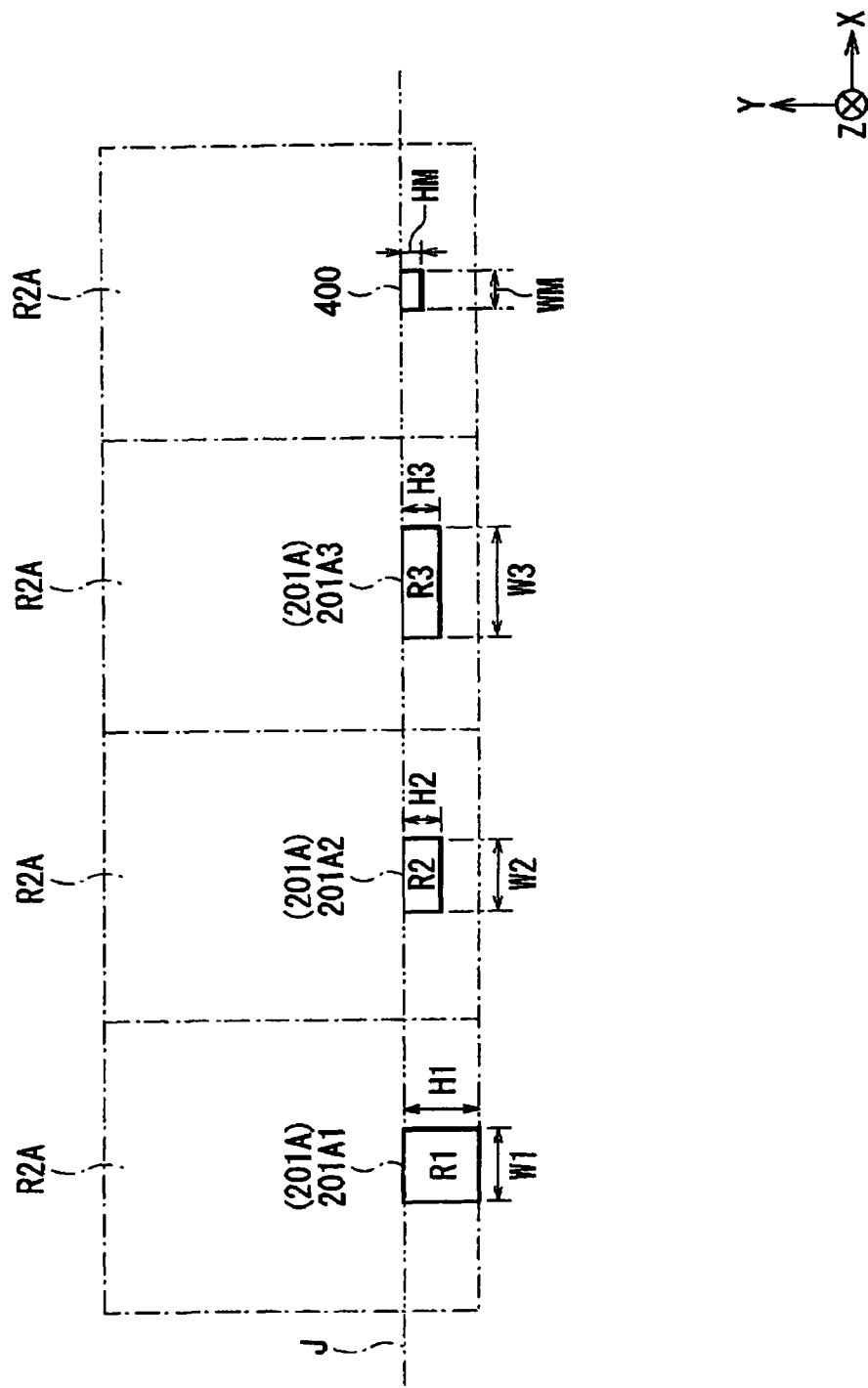
FIG. 3 is a plan view illustrating schematically an extraction from the planer configuration of a partial region of the thin film magnetic head integrated structure in FIG. 2.
Figure 4:
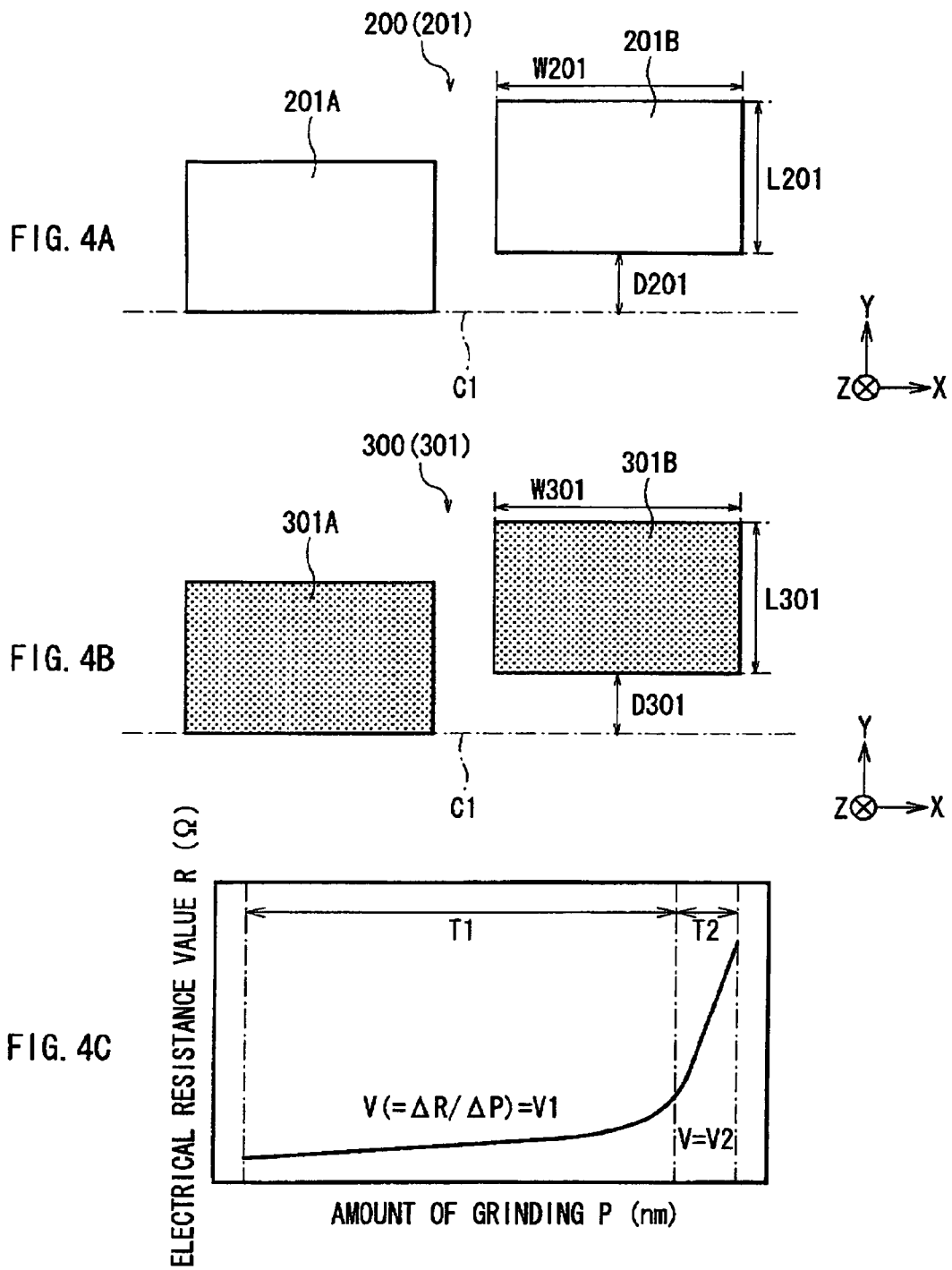
FIGS. 4A to 4C are plan views illustrating in enlarged size the planer configuration of a key part of the thin film magnetic head integrated structure in FIG. 2.

A detailed configuration of the thin film magnetic head integrated structure 100 will be described below with reference to FIGS. 1 to 4C. FIGS. 2 to 4C illustrate a detailed planar configuration of the thin film magnetic head integrated structure 100. FIG. 2 illustrates in enlarged size a partial region (a region R) of the thin film magnetic head integrated structure 100 in FIG. 1. FIG. 3 illustrates schematically only another region (only a region R2A) of the thin film magnetic head integrated structure 100 in FIG. 2. FIGS. 4A to 4C illustrate in enlarged size a key part (the RLG sensors 200 for read head core, and the RLG sensors 300 for write head core) of the thin film magnetic head integrated structure 100 in FIG. 2. Specifically, FIG. 4A illustrates one of the RLG sensors 200 for read head core, FIG. 4B illustrates one of the RLG sensors 300 for write head core, and FIG. 4C illustrates the correlation between the amount of grinding and the electrical resistance values, on which the abscissa represents the amount of grinding P (nm) and the ordinate represents the electrical resistance values R ($\Omega$). The alternate long and short dash lines in FIG. 2 indicate virtual lines (cutting lines C) indicating positions at which the wafer 101 are cut when the thin film magnetic head integrated structure 100 is used to manufacture thin film magnetic heads. In FIG. 2, a cutting line C1 indicates a segment of the cutting line C extending along the lateral direction (the X-axis direction), and a cutting line C2 indicates a segment of the cutting line C extending along the longitudinal direction (the Y-axis direction).

Figure 2:
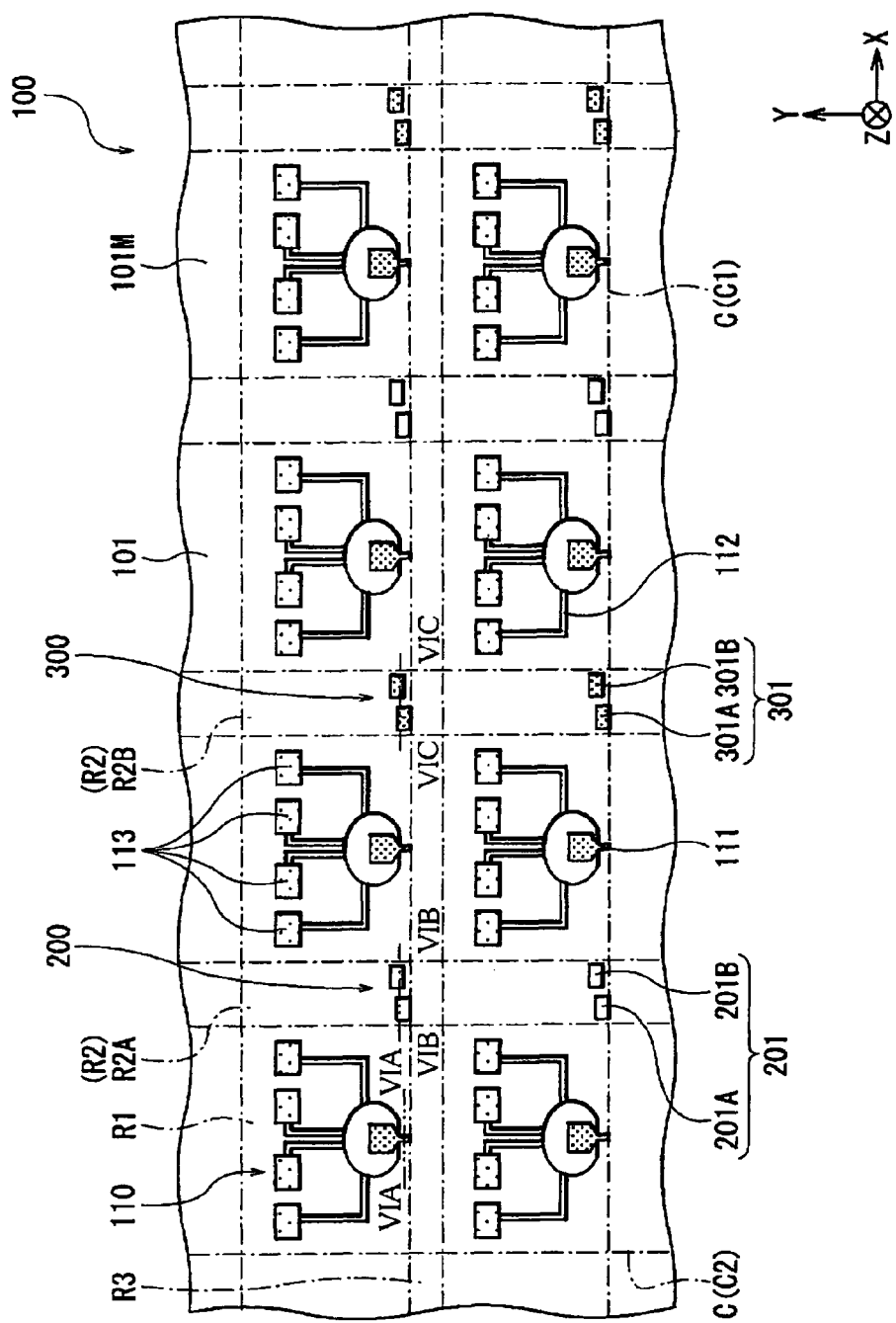
FIG. 2 is a plan view illustrating in enlarged size the planer configuration of a partial region of the thin film magnetic head integrated structure in FIG. 1.

In the region R of the thin film magnetic head integrated structure 100 in FIG. 1, as shown in FIG. 2, four thin film magnetic head precursors 110 are arranged in the X-axis direction in one row (the upper row in the drawing), and four thin film magnetic head precursors 110 are also arranged in the X-axis direction in another row (the lower row). Specifically, in the above-mentioned two rows, the thin film magnetic head precursors 110 are arranged in a region R1 (a first region) that are repeated with a predetermined interval (a region R2) n the X-axis direction.

In a region between two adjacent thin film magnetic head precursors 110 (a region R2 disposed between two adjacent regions R1, namely a second region), as shown in FIG. 2, there are disposed a plurality of RLG sensors 200 for read head core and a plurality of RLG sensors 300 for write head core, which are used to control the progress of a grinding process when the thin film magnetic head integrated structure 100 is used to form thin film magnetic heads (when thin film magnetic heads are formed by forming an air bearing surface by grinding the wafer 101 along with the thin film magnetic head precursors 110). The RLG sensors 200 for read head core and the RLG sensors 300 for write head core are arranged in a plurality of columns that correspond to the direction of arrangement of the thin film magnetic head precursors 110, namely they are repeated in the X-axis direction as in the thin film magnetic head precursors 110. More specifically, for example, the RLG sensors 200 for read head core and the RLG sensors 300 for write head core are alternately arranged in the region R2, so that the RLG sensors 200 for read head core are arranged in the regions R2A that are alternately disposed in the region R2, and the RLG sensors 300 for write head core are arranged in a region R2B that are alternately disposed, except for the regions R2A.

As shown in FIG. 3, for example, an M sensor 400, which is used to detect the electrical resistance values of a key part (a later-described MR element 6, refer to FIGS. 5 to 7) of each of the thin film magnetic head precursors 110, is provided at specific regions R2A that are set at spaced intervals of a predetermined number of the regions R2A in a series of the regions R2A where the RLG sensors 200 for read head core are provided. In other words, part of the plurality of RLG sensors 200 for read head core provided in the series of the regions R2A is replaced with the M sensor 400. In FIG. 3, the M sensor 400 is disposed in the specific regions R2A that are set at, for example, three regions R2A in the series of the regions R2A. That is, FIG. 3 illustrates a case where a combination of later-described three secondary resistive film sensors 201A (201A1, 201A2, and 201A3) and the M sensor 400 is repeated in the region R2A.

The region other than the regions R1 and R2 (R2A and R2B) in FIG. 2 (a region R3 including none of the thin film magnetic head precursor 110, the RLG sensors 200 for read head core, the RLG sensors 300 for write head core, and the M sensor 400) is an excess space to be discarded as an excess portion when the wafer 101 is cut along the cutting line C1 in the manufacturing step of the thin film magnetic head.

As shown in FIG. 2, each of the thin film magnetic head precursors 110 includes, for example, a laminate structure 111 that is substantially the preformed structure of the thin film magnetic head, and electrode pads 113 electrically connected to the laminate structure 111 via a wiring pattern 112. FIG. 2 illustrates, for example, a case where four electrode pads 113 are connected to the laminate structure 111 via four wiring patterns 112. The above-mentioned number of the wiring patterns 112 and the number of the electrode pads 113, and the arrangements (e.g., the positions and the shapes) of the wiring patterns 112 and the electrode pads 113 are for purposes of illustration only and are not to be construed as limiting values. In each of the thin film magnetic head precursors 110, when the wafer 101 is cut along the cutting line C1 in the manufacturing step of the thin film magnetic heads, key parts (the later-described MR element 6 and a magnetic pole layer 20, refer to FIGS. 5 to 7) in the laminate structure 111 are exposed on its cutting surface (a later-described cutting surface 101K1 (a grinding start surface) refer to FIG. 15), the laminate structure 111 is positioned so that the above-mentioned key part is adjacent to the region R3 in the region R1.

The RLG sensors 200 for read head core are disposed in the same hierarchy as a later-described read head core 111A in the thin film magnetic head precursor 110, and are used to control the progress of a grinding process with respect to the read head core when the thin film magnetic head integrated structure 100 is used to form the thin film magnetic heads. Unlike the RLG sensors 300 for write head core that are used as an auxiliary sensor for adjusting the inclination of a grinding surface as described later, the RLG sensors 200 for read head core are particularly used as a primary sensor for substantially adjusting the amount of grinding, in order to control the progress of a grinding process when the thin film magnetic heads are formed by performing it from the grinding start surface with respect to the thin film magnetic head precursors 110, as described above.

As shown in FIG. 2, for example, the RLG sensors 200 for read head core include a resistive film pattern 201 that is substantially a sensor part. The RLG sensors 200 for read head core include the resistive film pattern 201, along with an electrode pad (not shown) that is electrically connected via a wiring pattern (not shown) to the resistive film pattern 201. The resistive film pattern 201 is a resistive film pattern for read head core that is used to detect the amount of grinding of the read head core based on changes in electrical resistance values responsive to the amount of grinding (a size change in the resistive film pattern 201 due to the grinding process). In particular, the resistive film pattern 201 contains two types of resistive film sensors each having similar material, size, and shape (rectangular shape), that is, a secondary resistive film pattern 201A (a first resistive film pattern) that is positioned on the side near a grinding start surface (a cutting surface 101K1), and a primary resistive film pattern 201B (a second resistive film pattern) that is positioned on the side far from the grinding start surface. In the RLG sensors 200 for read head core, as shown in FIG. 4A, the secondary resistive film pattern 201A and the primary resistive film pattern 201B are arranged so as to be partially adjacent to each other in the X-axis direction. That is, the primary resistive film pattern 201B recedes more than the secondary resistive film pattern 201B in the Y-axis direction. A recession distance D201 of the primary resistive film pattern 201B with respect to the secondary resistive film pattern 201A can be set freely depending on the sizes of the secondary resistive film pattern 201A and the primary resistive film pattern 201B. As an example, when the secondary resistive film pattern 201A and the primary resistive film pattern 201B have a width W201 of about 20 μm and a length L201 of about 20 μm, the recession distance D201 is about 3 μm to 5 μm. In the RLG sensors 200 for read head core, the secondary resistive film pattern 201A is positioned so that one end thereof is adjacent to the region R3 (extends along the cutting line C1) within the region R2A, in order that, when the wafer 101 is cut along the cutting line C1 in the manufacturing step of the thin film magnetic heads, a resistive film pattern 201 (the secondary resistive film pattern 201A) is exposed on the cutting surface.

The RLG sensors 300 for write head core is disposed in the same hierarchy as a later-described write head core 111B in the thin film magnetic head precursor 110, and is used to control the progress of a grinding process with respect to the write head core when the thin film magnetic head integrated structure 100 is used to form the thin film magnetic head. The RLG sensors 300 for write head core is used as an auxiliary sensor for adjusting the inclination of a grinding surface as described later, in order to control the progress of the grinding process when the thin film magnetic heads are formed by performing it from the grinding start surface with respect to the thin film magnetic head precursors 110, as described above.

For example, the RLG sensors 300 for write head core has the same configuration as the above-mentioned RLG sensors 200 for read head core, and is configured so as to include a resistive film pattern 301 that is substantially a sensor part, as shown in FIG. 2. The resistive film pattern 301 is a resistive film pattern for write head core that is used to detect the amount of grinding of the write head core based on changes in electrical resistance values responsive to the amount of grinding (a size change in the resistive film pattern 301 due to the grinding process). In particular, the resistive film pattern 301 has the same configuration as the above-mentioned resistive film pattern 201, that is, includes a secondary resistive film pattern 301A (a first resistive film pattern) that is positioned on the side near the grinding start surface (the cutting surface 101K1), and a primary resistive film pattern 301B (a second resistive film pattern) that is positioned on the side far from the grinding start surface. In the RLG sensors 300 for write head core, as shown in FIG. 4B, the secondary resistive film pattern 301A and the primary resistive film pattern 301B are arranged so as to be partially adjacent to each other in the X-axis direction, as in the above-mentioned RLG sensors 200 for read head core. As an example, when the secondary resistive film pattern 301A and the primary resistive film pattern 301B have a width W301 of about 20 μm and a length L301 of about 20 μm, a recession distance D301 is about 3 μm to 5 μm. In the RLG sensors 300 for write head core, as in the RLG sensors 200 for read head core, the secondary resistive film pattern 301A is positioned so that one end thereof is adjacent to the region R3 (extends along the cutting line C1) within a region R2B, in order that, when the wafer 101 is cut along the cutting line C1 in the manufacturing step of the thin film magnetic heads, a resistive film pattern 301 (the secondary resistive film pattern 301A) is exposed on the cutting surface.

In particular, there is a consistency in the positional relationship between the resistive film pattern 201 (the secondary resistive film pattern 201A, and the primary resistive film pattern 201B) and the resistive film pattern 301 (the secondary resistive film pattern 301A, and the primary resistive film pattern 301B). That is, in the direction of grinding (the Y-axis direction), the position of the secondary resistive film pattern 201A coincides with the position of the secondary resistive film pattern 301A, and the position of the primary resistive film pattern 201B coincides with the position of the primary resistive film pattern 301B.

Four resistive film sensors (the secondary resistive film sensors 201A and 301A, and the primary resistive film sensors 201B and 301B), which are used to control the progress of the grinding process when the thin film magnetic heads are formed by using the thin film magnetic head integrated structure 100, have electrical characteristics, for example, as shown in FIG. 4C. Specifically, the electrical resistance value R of each of the secondary resistive film pattern 201A and 301A, and the primary resistive film sensors 201B and 301B is increased gradually as the amount of grinding P is increased (as the grinding process proceeds). In this case, change rates V of the amount of grinding P to the electrical resistance values R ($=\Delta R/\Delta P$) are shifted from relatively small change rates V1 (first change rates) to relatively large change rates V2 (V2>V1, second change rates) during the grinding process. That is, the range of the amount of grinding P consists of a range in which the relatively small change rate V1 is obtained (a range T1), and a range in which the relatively large change rate V2 is obtained (a range T2). For example, the change rate V1 is a change rate in the range in which the change rate in the change gradient of the electrical resistance value R is substantially constant. More particularly, it is a change rate that requires about 100 nm to 400 nm in the amount of grinding P in order to change the electrical resistance value R by about 10Ω. On the other hand, the change rate V2 is a change rate in the range in which the change rate in the change gradient of the electrical resistance value R is continuously increased. More particularly, it is a change rate that requires about 10 nm or less in the amount of grinding P in order to change the electrical resistance value R by about 10Ω. When the thin film magnetic head integrated structure 100 is used to form the thin film magnetic heads, the grinding process is progressed by measuring the electrical resistance value in the range T2, with the use of the above-mentioned four resistive film sensors as will be described later.

The width WM and the height HM of the M sensor 400 are set so as to be the same as the above-mentioned size of the MR element 6. For example, the above-mentioned three secondary resistive film sensors 201A1, 201A2, and 201A3 have the following sizes. The secondary resistive film pattern 201A1 is 20 μm in the width W1 and 20 μm in the height H1. The secondary resistive film pattern 201A2 is 20 μm in the width W2 (=W1) and 10 μm in the height H2 (=H1−10 μm). The secondary resistive film pattern 201A3 is 30 μm in the width W3 (=W1+10 μm) and 10 μm in the height H3 (=H1−10 μm). As shown in FIG. 3, in the secondary resistive film sensors 201A1 to 201A3, and the M sensor 400, the edge (the upper end as shown in FIG. 3) on a side opposite the side where the air bearing surface is formed in the manufacturing step of the thin film magnetic heads is positioned so as to extend along a virtual line (a reference line J) parallel to the X-axis.

Figure 5:
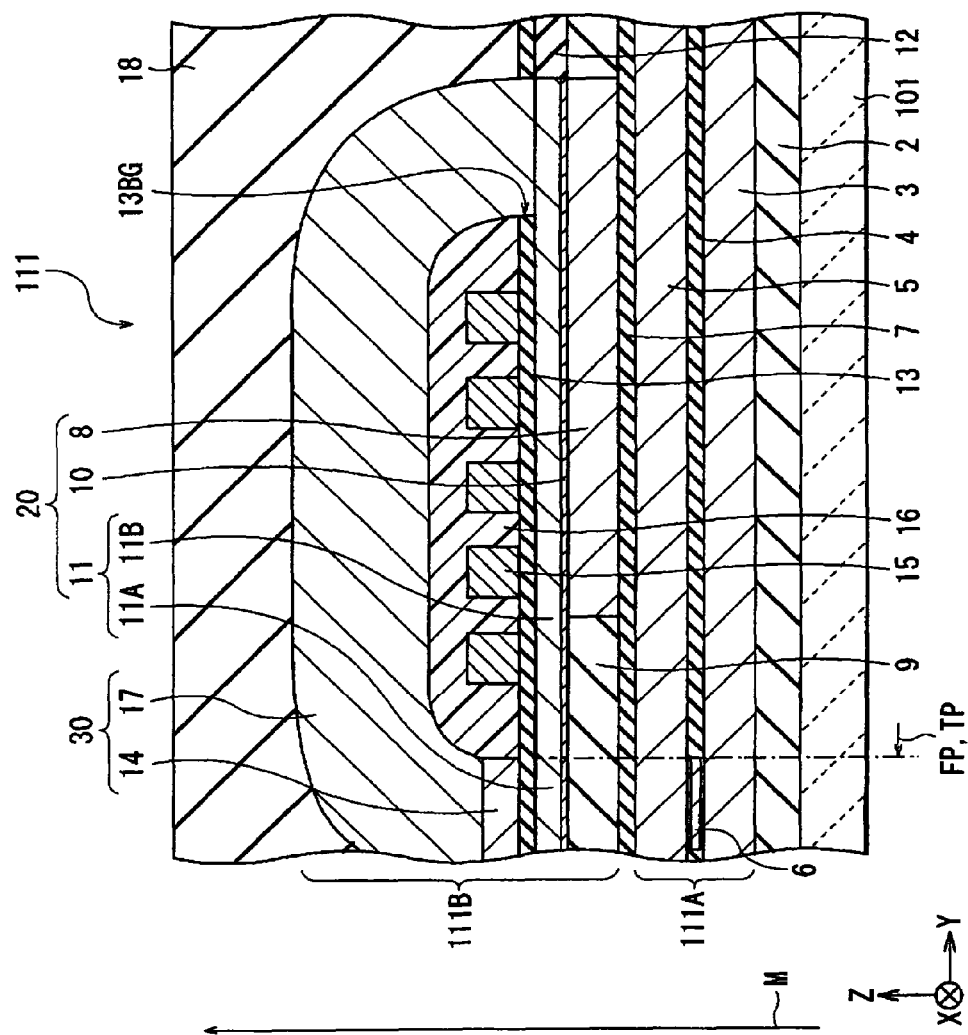
FIG. 5 is a sectional view illustrating a sectional configuration (a sectional configuration along a YZ plane) of a laminate structure of the thin film magnetic head integrated structure in FIG. 1.
Figure 6:
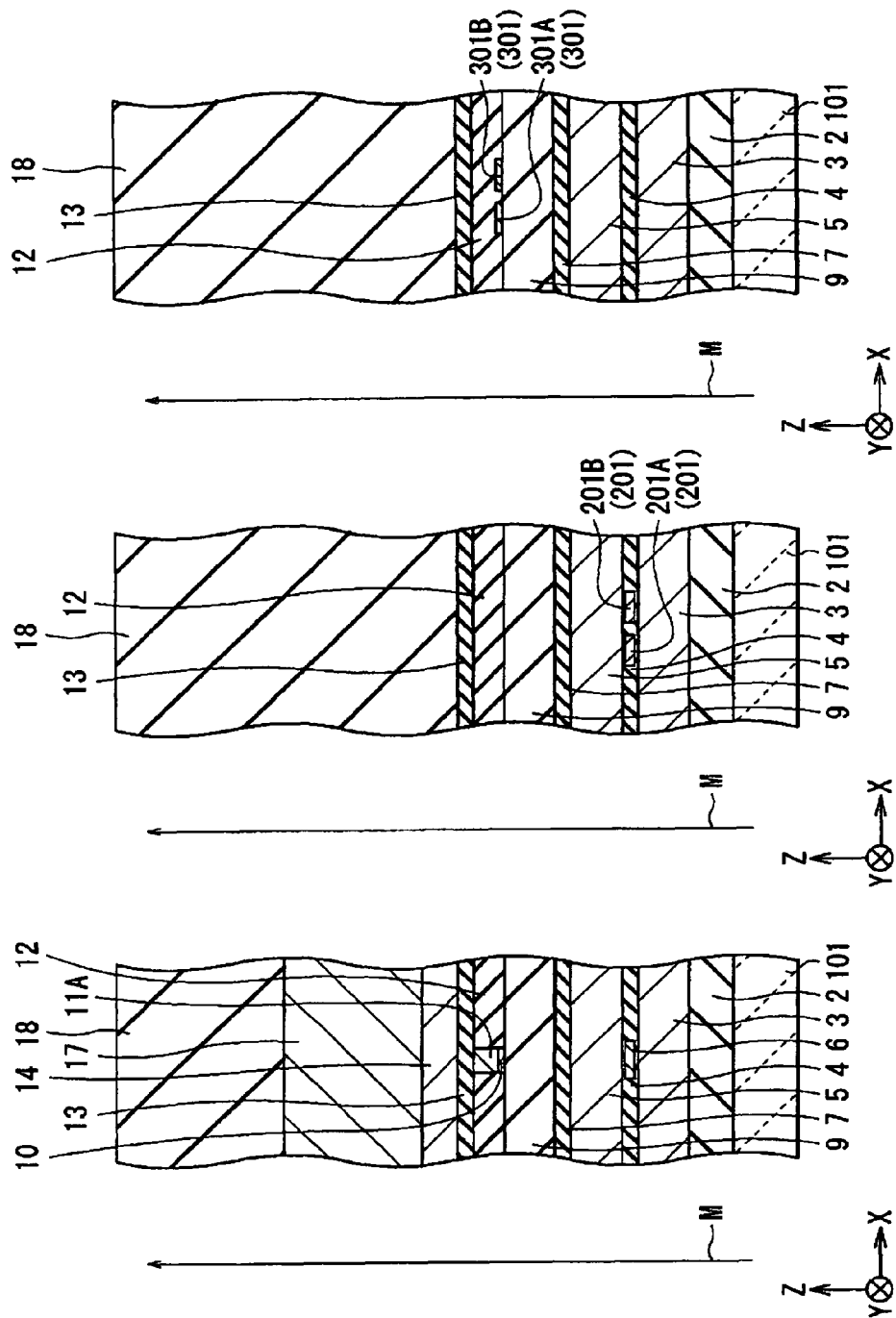
FIGS. 6A to 6C are sectional views illustrating other sectional configuration (a sectional configuration along an XZ surface) of a laminate structure in FIG. 5.

The detailed configuration of the laminate structures 111 of the thin film magnetic head precursors 110 will be described with reference to FIGS. 1 to 7. FIGS. 5 to 7 illustrate the configuration of the laminate structure 111. Specifically, FIG. 5 illustrates a sectional configuration (a sectional configuration taken along a YZ plane). FIGS. 6A to 6C illustrate another sectional configuration (a sectional configuration taken along an XZ plane). FIG. 7 illustrates a planar configuration (configuration viewed from a Z-axis direction). More specifically, FIG. 6A illustrates a cross section taken along the line VIA-VIA in FIG. 2, FIG. 6B illustrates a cross section taken along the line VIB-VIB in FIG. 2, and FIG. 6C illustrates a cross section taken along the line VIC-VIC in FIG. 2. In FIGS. 5 and 6A to 6C, the upward arrows M indicate a direction (a medium traveling direction M) in which a recording medium (not shown) relatively shifts with respect to a later-described thin film magnetic head.

The laminate structures 111 become the substantial thin film magnetic heads by the formation of the air bearing surface through the grinding process in the manufacturing step of the thin film magnetic heads, and are arranged in the region R1 in the element forming surface 101M of the wafer 101. For example, as shown in FIG. 5 and FIG. 6A, each of the laminate structures 111 has such a laminate structure that an insulating layer 2 formed of a non-magnetic insulating material such as aluminum oxide ($Al_2O_3$, hereinafter refer to as "alumina"), a read head core 111A that performs a read process by utilizing magneto-resistive effect (MR), a separating layer 7 formed of a non-magnetic insulating material such as alumina, a write head core 111B of shield type that performs a write process of perpendicular recording system, and an overcoat layer 18 formed of a non-magnetic insulating material such as alumina, are laminated in this order on the wafer 101.

The read head core 111A has, for example, such a laminate structure that a lower lead shield layer 3, a shield gap film 4, and an upper lead shield layer 5 are laminated in this order. The MR element 6 as a read element is buried in the shield gap film 4.

The lower lead shield layer 3 and the upper lead shield layer 5 magnetically separate the MR element 6 from the surroundings, and extend from the side that becomes the air bearing surface (the left side in FIG. 5, or the lower side in FIG. 7) to the rear. For example, the lower lead shield layer 3 and the upper lead shield layer 5 are formed of a magnetic material such as nickel iron alloy (NiFe (e.g., 80 weight % of nickel and 20 weight % of iron), hereinafter referred to simply as "permalloy (product name)"), and these layers have a thickness of about 1.0 μm to 2.0 μm.

The shield gap film 4 electrically separates the MR element 6 from the surroundings, and is formed of a non-magnetic insulating material such as alumina.

The MR element 6 performs a magnetic process (a read process) by utilizing giant magneto-resistive effect (GMR) or tunneling magneto-resistive effect (TMR), and extends from the side that becomes the air bearing surface to the rear.

The write head core 111B has, for example, such a laminate structure that a magnetic pole layer 20 whose circumference is buried by the insulating layers 9 and 12, a gap layer 13 provided with an opening for magnetic coupling (a back gap 13BG), a thin film coil 15 that is buried by an insulating layer 16, and a write shield layer 30 are laminated in this order.

The magnetic pole layer 20 performs a magnetic process (write process) by containing a magnetic flux generated in the thin film coil 15, and emitting the magnetic flux toward a recording medium. The magnetic pole layer 20 extends from the side that becomes the air bearing surface to the rear, and particularly to the back gap 13BG disposed in the gap layer 13. The magnetic pole layer 20 has, for example, such a three-layer structure of laminating a main magnetic pole layer 11 functioning as a magnetic flux emitting portion, an auxiliary magnetic pole layer 8 functioning as a magnetic flux containing portion in order to ensure a magnetic volume (a magnetic flux containing amount) of the main magnetic pole layer 11, and a seed layer 10 provided between the main magnetic pole layer 11 and the auxiliary magnetic pole layer 8. The insulating layers 9 and 12 electrically separate the auxiliary magnetic pole layer 8 and the main magnetic pole layer 11 from the surroundings, respectively, and are formed of a non-magnetic insulating material such as alumina.

The auxiliary magnetic pole layer 8 extends on a leading side of the main magnetic pole layer 11 from a position recedes more than the main magnetic pole layer 11 to the rear, and particularly to the back gap 13BG, so that it is magnetically coupled to the main magnetic pole layer 11 with the seed layer 10 in between. For example, the auxiliary magnetic pole layer 8 is formed of the same material as the main magnetic pole layer 11, and has a rectangular plane shape with a width W2, as shown in FIG. 7. As used herein, the term "leading side" means, when the traveling state of a recording medium traveling to the medium traveling direction M, as shown in FIGS. 5 and 6A to 6C, is considered as a flow, an inflow side (the opposite side of the medium traveling direction M side), that is, it means here the lower side of the layer in the thickness direction (the Z-axis direction). In contrast, an outflow side (the medium traveling direction M side) is called "trailing side," and it means here the upper side of the layer in the thickness direction.

The main magnetic pole layer 11 extends on the trailing side of the auxiliary magnetic pole layer 8 from the side that becomes the air bearing surface to the rear, and particularly to the back gap 13BG, as in the auxiliary magnetic pole layer 8. The main magnetic pole layer 11 is formed of a magnetic material such as permalloy or iron-cobalt-base alloy. Examples of the "iron-cobalt-base alloy" are iron-cobalt-base alloy (FeCo) and iron cobalt nickel alloy (FeCoNi). It is particularly preferable that the main magnetic pole layer 11 is formed of a magnetic material having a high saturation magnetic flux density such as the above-mentioned iron-cobalt-base alloy. As shown in FIG. 7, the main magnetic pole layer 11 has a uniform width W1 (e.g., about 0.15 μm), which defines a write track width of a recording medium, in a sequential order from the side that becomes the air bearing surface. A front end portion 11A functioning as a track-width-defining part that defines the write track width, is connected to a rear end portion 11B having a larger width W2 than the width W1 of the front end portion 11A (W2>W1). For example, the width of the rear end portion 11B is uniform (the width W2) at the rear, and is narrowed gradually so as to be the width W1 as it approaches the front end portion 11A at the front. The position at which the width of the main magnetic pole layer 11 expands from the front end portion 11A (the width W1) to the rear end portion 11B (the width W2) is a "flare point FP" that is one of important factors determining the write performance of the thin film magnetic heads.

The seed layer 10 is used, for example, as an electrode film to grow a plating film, and more particularly used to form the main magnetic pole layer 11 by plating. For example, the seed layer 10 is formed of the same magnetic material as the main magnetic pole layer 11, or a non-magnetic material different from the main magnetic pole layer 11, and it has a pattern shape corresponding to the plane shape of the main magnetic pole layer 11. Examples of the above-mentioned "non-magnetic material" are ruthenium (Ru) and titanium (Ti). In FIG. 7, the seed layer 10 is not illustrated.

The gap layer 13 forms a gap (a magnetic gap) for magnetically separating the magnetic pole layer 20 and the light shield layer 30 from each other. The gap layer 13 is formed of a non-magnetic insulating material such as alumina, and has a thickness of about 0.2 μm or less.

The thin film coil 15 generates a magnetic flux for writing, and is formed of a high conductive material such as copper (Cu). The thin film coil 15 has a winding structure (a spiral structure) wound around the back gap 13BG, as shown in FIGS. 5 and 7. In FIGS. 5 and 7, only part of a plurality of windings constituting the thin film coil 15 is illustrated.

The insulating layer 16 covers the thin film coil 15 to be electrically separated from the surroundings, and is disposed on the gap layer 13 so as not to block the back gap 13BG. The insulating layer 16 is formed of a non-magnetic insulating material such as photoresist (photosensitive resin) or spin on glass (SOG), each of which exhibits flowability by heating. The portions around the edge of the insulating layer 16 form a rounded slope. The forwardmost end position of the insulating layer 16 is a "throat height zero position TP" that is the other one of the important factors determining the write performance of the thin film magnetic heads.

The light shield layer 30 increases the magnetic field gradient of a recording magnetic field (a vertical magnetic field) by capturing a spreading component of a magnetic flux emitted from the magnetic pole layer 20. In addition to the function of preventing the spreading of the magnetic flux as above described, the light shield layer 30 also has the following function. That is, when a magnetic flux is emitted from the magnetic pole layer 20 toward a recording medium, the light shield layer 30 recovers the magnetic flux passed through the recording medium (used in a write process) and resupplies it to the magnetic pole layer 20, thereby circulating the magnetic flux between the thin film magnetic head and the recording medium. The light shield layer 30 extends on the trailing side of the magnetic pole layer 20 from the side that becomes the air bearing surface to the rear, so that it is separated from the magnetic pole layer 20 by the gap layer 13 at the front, and coupled to the magnetic pole layer 20 via the back gap 13BG at the rear.

For example, the light shield layer 30 extends from the side that becomes the air bearing surface to the rear, while being disposed adjacent to the gap layer 13. Specifically, the light shield layer 30 has a structure that a TH specifying layer 14 extending to a position between the position that becomes the air bearing surface and the back gap 13BG is coupled to a yoke layer 17 exending on the trailing side of the TH defining layer 14 from the side that becomes the air bearing surface to the rear, and particularly to the back gap 13BG. That is, the light shield layer 30 has a two-layer structure that the yoke layer 17 is laminated on the TH defining layer 14.

The TH defining layer 14 functions as an intake port for taking in a major magnetic flux. The TH defining layer 14 is composed of a magnetic material such as permalloy, iron nickel alloy (FeNi), or iron-cobalt-base alloy, and has a rectangular plane shape having a width W3 larger than the width W2 of the main magnetic pole layer 11 (W3>W2), as shown in FIG. 7. The insulating layer 16 with the thin film coil 15 buried therein is adjacent to the TH defining layer 14. That is, the TH defining layer 14 functions to define the forwardmost end position (the throat height zero position TP) of the insulating layer 16.

The yoke layer 17 functions as a path of the magnetic flux captured through the TH defining layer 14. For example, the yoke layer 17 extends from the side that becomes the air bearing surface to the back gap 13BG, so that it partially overlies the TH defining layer 14 at the front, and is coupled to the magnetic pole layer 20 via the back gap 13BG at the rear. For example, the yoke layer 17 is formed of the same magnetic material as the TH defining layer 14, and has a rectangular plane shape having a width W3 as shown in FIG. 7.

In the element forming surface 101M of the wafer 101 as shown in FIG. 2, the regions R2A and R2B are provided with a laminate structure having substantially the same structure as the laminate structure 111 disposed in the region R1, as shown in FIGS. 6B and 6C.

Specifically, as shown in FIG. 6B, the region R2A is provided with a laminate structure having the same structure as the laminate structure 111, except that it includes the resistive film pattern 201 (the secondary resistive film pattern 201A, and the primary resistive film pattern 201B) instead of the MR element 6, and does not include the magnetic pole layer 20, the thin film coil 15 and the light shield layer 30. That is, the resistive film pattern 201 disposed in the region R2A is arranged in the same layer as the MR element 6 of the read head core 111A disposed in the region R1. The resistive film pattern 201 is formed in parallel with the MR element 6, in the step of forming the thin film magnetic head precursor 110 on the element forming surface 101M of the wafer 101. The M sensor 400 disposed in the region R2A is formed in parallel so as to have the same size as the MR element 6, in order to detect the electrical resistance values of the MR element 6 as described above.

On the other hand, as shown in FIG. 6C, the region R2B is provided with a laminate structure having the same structure as the laminate structure 111, except that it includes the resistive film pattern 301 (the secondary resistive film pattern 301A, and the primary resistive film pattern 301B) instead of the magnetic pole layer 20, and does not contain the MR element 6, the thin film coil 15 and the light shield layer 30. That is, the resistive film pattern 301 disposed in the region R2B is arranged in the same layer as the magnetic pole layer 20 of the write head core 111B disposed in the region R1. The resistive film pattern 301 is formed in parallel with the magnetic pole layer 20, in the step of forming the thin film magnetic head precursor 110 on the element forming surface 101M of the wafer 101. In FIG. 6C, there is illustrated, for example, a case where the resistive film pattern 301 is arranged in the same layer as the seed layer 10 of the magnetic pole layer 20, and the resistive film pattern 301 is formed in parallel with the seed layer 10.

The functions of the RLG sensors 200 for read head core and the RLG sensors 300 for write head core as shown in FIG. 2 will be described more specifically with reference to FIGS. 5 to 7. That is, the resistive film pattern 201 (the secondary resistive film pattern 201A and the primary resistive film pattern 201B) of the RLG sensors 200 for read head core are used to detect the amount of grinding of the read head core 111A, in order that the size of the MR element 6 has a predetermined size in the manufacturing step of the thin film magnetic heads. As used herein00, the term "the size of the MR element 6" means the height from the front end of the MR element 6 (the edge exposed on the air bearing surface) to the rear end (the edge far from the air bearing surface) in the completed thin film magnetic heads with the air bearing surface formed thereon, namely the MR height that is an important factor contributing to the read performance of the thin film magnetic head. The resistive film pattern 301 (the secondary resistive film pattern 301A and the primary resistive film pattern 301B) of the RLG sensors 300 for write head core are used to detect the amount of grinding of the write head core 111B, in order that the size of the tip portion 11A of the magnetic pole layer 20 has a predetermined size in the manufacturing step of the thin film magnetic head. As used herein, the term "the size of the tip portion 11A" means the height from the front end of the tip portion 11A (the edge exposed on the air bearing surface) to the rear end (the flare point FP) in the completed thin film magnetic head with the air bearing surface formed thereon, namely the neck height that is an important factor contributing to the write performance of the thin film magnetic head. In some cases, for example, an appropriate offset may be provided between the height of the resistive film pattern 301 and the neck height (the height of the tip portion 11A). As used herein, the MR height and the neck height will be specifically expressed as an "MR height MHO and a "neck height NH" in later-described FIGS. 21 and 22, respectively.

A method of manufacturing a thin film magnetic head integrated structure 100 as shown in FIGS. 1 to 7 will next be described with reference to FIGS. 1 to 13B. FIGS. 8A to 13B explain the step of forming key parts (the magnetic pole layer 20 and the resistive film pattern 301) of the thin film magnetic head integrated structure 100, in a method of manufacturing the thin film magnetic head integrated structure 100. Specifically, FIGS. 8A, 9A, 10A, 11A, 12A and 13A illustrate in enlarged size a part of the region R1 as shown in FIG. 2, and FIGS. 8B, 9B, 10B, 11B, 12B and 13B illustrate in enlarged size a part of the region R2B as shown in FIG. 2. In the following, firstly, the outline of manufacturing steps of the thin film magnetic head integrated structure 100 (the thin film magnetic head precursors 110, the RLG sensors 200 for read head core, and the RLG sensors 300 for write head core) will be described with reference to FIGS. 1 to 7. Thereafter, the steps of forming the laminate structure 111 and the resistive film sensors 201 and 301 will be described in detail with reference to FIGS. 1 to 13B. Since the materials, the sizes, and the structural features of a series of components of the thin film magnetic head integrated structure 100 have already been described in detail, their respective descriptions will be left out of the following.

The thin film magnetic head integrated structure 100 can be manufactured by sequentially forming and laminating the respective components with the use of the existing thin film processes including film forming techniques such as plating process or sputtering, patterning techniques such as photolithography process, and etching techniques such as dry etching or wet etching.

When forming the thin film magnetic head integrated structure 100, as shown in FIGS. 1 to 7, after preparing the wafer 101, the laminate structure 111 is formed so as to be arranged in a plurality of rows in the region R1 in the element forming surface 101M of the wafer 101. Similarly, the resistive film sensors 201 (the secondary resistive film pattern 201A and the primary resistive film pattern 201B) and 301 (the secondary resistive film pattern 301A and the primary resistive film pattern 301B), and the M sensor 400 are also formed so as to be arranged in a plurality of rows that correspond to the direction of arrangement of the laminate structures 111. For example, the resistive film pattern 201 is arranged at a part of the region R2, namely the region R2A, and the resistive film pattern 301 is arranged in the rest of the region R2, namely the region R2B. As a result, the resistive film sensors 201 and 301 are arranged alternately in the region R2 (R2A and R2B), and in particular, part of the resistive film pattern 201 is replaced with the M sensor 400. Besides the regions R1, R2 (R2A and R2B), for example, a region R3 as an excess part is ensured as shown in FIG. 2, when the laminate structure 111 and the resistive film sensors 201 and 301 are formed on the element forming surface 101M of the wafer 101.

Subsequently, a wiring pattern 112 is formed in the region R1 so as to be led from the laminate structure 111, and then the electrode pad 113 is formed so as to make an electrical connection via the wiring pattern 112 to the laminate structure 111, thereby forming the thin film magnetic head precursor 110. Although not illustrated, when forming the wiring pattern 112 and the electrode pad 113, the RLG sensors 200 for read head core is formed in the region R2A so as to have such a structure that an electrode pad is electrically connected via the wiring pattern to the resistive film pattern 201. Similarly, the RLG sensors 300 for write head core is formed in the region R2B so as to have such a structure that an electrode pad is electrically connected via the wiring pattern to the resistive film pattern 301. This completes the thin film magnetic head integrated structure 100 as shown in FIGS. 1 to 7.

In the above-mentioned manufacturing step of the thin film magnetic head integrated structure 100, when forming the thin film magnetic head precursor 110, the wiring pattern 112 is formed separately from the laminate structure 111. Without limiting to this, for example, the wiring pattern 112 may be formed in parallel with the laminate structure 111.

When forming the laminate structure 111 and the resistive film sensors 201 and 301, as shown in FIGS. 2, 5, and 6A, after forming the insulating layer 2 in the region R1 in the element forming surface 101M of the wafer 101, firstly, the lower lead shield layer 3, the shield gap film 4 with the MR element 6 buried, and the upper lead shield layer 5 are laminated in this order on the insulating layer 2, thereby forming the read head core 111A having a laminate structure extending from the lower lead shield layer 3 to the upper lead shield layer 5. In this case, as shown in FIGS. 6B and 6C, the insulating layer 2, the lower lead shield layer 3, the shield gap film 4, and the upper lead shield layer 5 are similarly laminated by forming them side by side, in the regions R2A and R2B, along with the region R1.

In particular, when the MR element 6 is formed in the region R1, as shown in FIGS. 2, 4, and 6B, a pattern formation of the MR element 6 is performed in the region R1 and, at the same time, the step of forming the MR element 6 is used to form a pattern film similar to the MR element 6 in the region R2A, so that the resistive film pattern 201 and the M sensor 400 are formed in parallel with the MR element 6. In this case, as shown in FIG. 3, it is arranged so that three types of secondary resistive film sensors 201A1 to 201A3 having different pattern sizes are included, and the M sensor 400 has the same pattern size as the MR element 6. Naturally, the secondary resistive film sensors 201A (201A1 to 201A3) and the M sensor 400, which are-formed in parallel with the MR element 6, are formed so as to include the same material as the MR element 6. The pattern formations of the resistive film pattern 201 and the M sensor 400 are performed with a pattern formation technique using photolithography process. This pattern formation technique will be described later in detail.

Subsequently, as shown in FIGS. 2, 5, and 6A, after the separating layer 7 is formed on the read head core 111A in the region R1, the magnetic pole layer 20, whose circumference is buried with the insulating layers 9 and 12, is formed on the separating layer 7. When forming the magnetic pole layer 20, the auxiliary magnetic pole layer 8 is formed so that its circumference is buried with the insulating layer 9. Thereafter, on the insulating layer 9 and the auxiliary magnetic pole layer 8, the seed layer 10 and the main magnetic pole layer 11 are formed so that their circumferences are buried with the insulating layer 12. This results in a three-layer structure that the auxiliary magnetic pole layer 8, the seed layer 10 and the main magnetic pole layer 11 are laminated in this order. In this case, as shown in FIGS. 6B and 6C, the insulating layers 9 and 12 are similarly laminated by forming them side by side, in the regions R2A and R2B, along with the region R1.

In particular, when the magnetic pole layer 20 is formed in the region R1, as shown in FIGS. 2 and 6C, the magnetic pole layer 20 is formed in the region R1 and, at the same time, a pattern film similar to the magnetic pole layer 20 is formed in the region R2B by using the step of forming the magnetic pole layer 20, so that the resistive film pattern 301 is formed in parallel with the magnetic pole layer 20, by employing the following procedure.

Figure 8A:
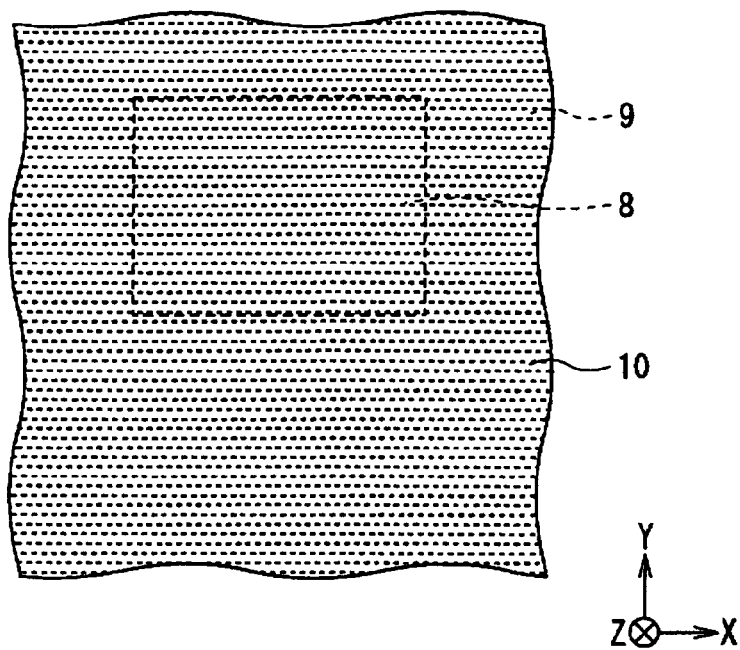
FIGS. 8A and 8B are plan views for explaining the step of forming a key part of the thin film magnetic head integrated structure, as a method of manufacturing the thin film magnetic head integrated structure of an embodiment.
Figure 8B:
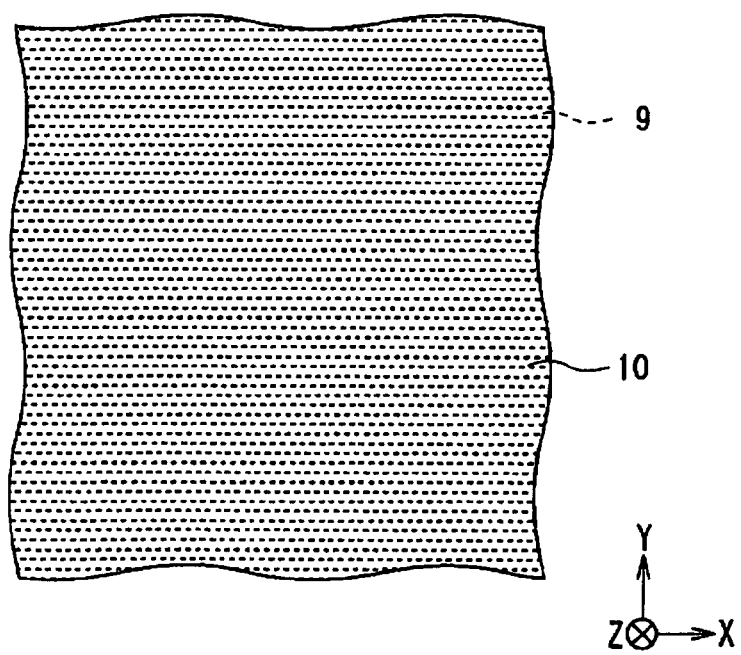

That is, when the resistive film pattern 301 is formed in parallel with the magnetic pole layer 20, firstly, as shown in FIGS. 8A and 8B, the seed layer 10 is formed so as to cover both of the regions R1 and R2B in the element forming surface 101M of the wafer 101 by using sputtering method, for example. The material of the seed layer 10 may be the same as the main magnetic pole layer 11 formed in the succeeding step, for example, a conductive magnetic material such as permalloy (NiFe) or iron cobalt nickel alloy (Fe-CoNi). Alternatively, it may be different from the material of the main magnetic pole layer 11, for example, a conductive non-magnetic material such as ruthenium (Ru) or titanium (Ti).

Figure 9A:
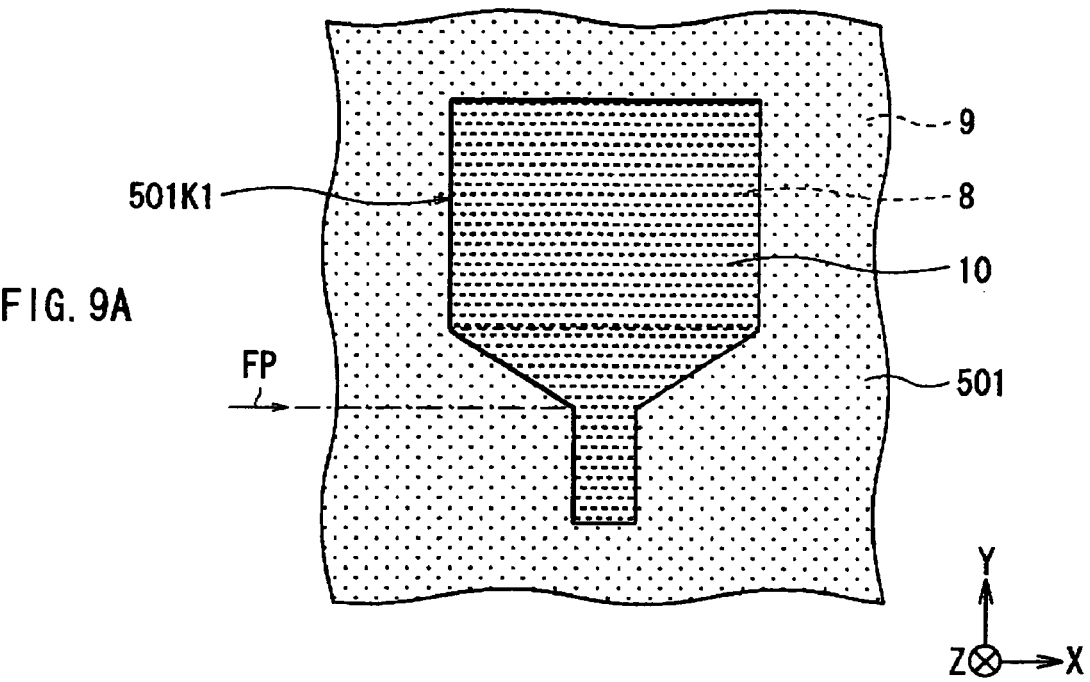
FIGS. 9A and 9B are plan views for explaining the succeeding steps of the steps in FIGS. 8A and 8B.
Figure 9B:
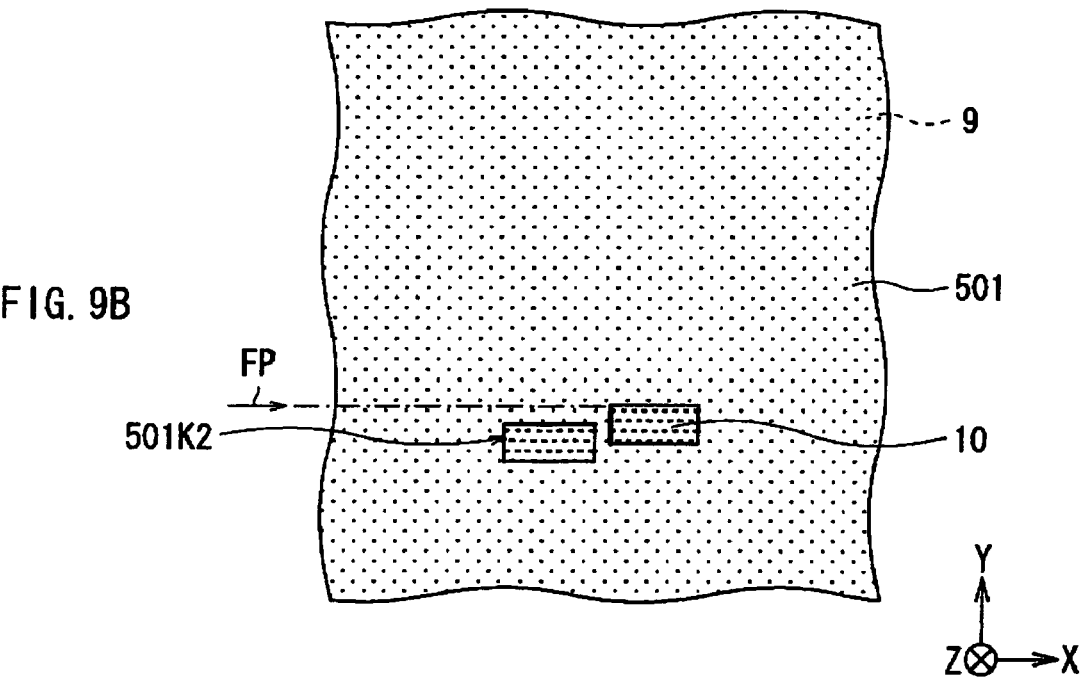

Subsequently, after a photoresist film is formed by applying photoresist on the surface of the seed layer 10, the photoresist film is subjected to patterning (development and exposure) by using photolithography process, so that a photoresist pattern 501 is formed as shown in FIGS. 9A and 9B. When forming the photoresist pattern 501, the region R1 and the region R2B are allowed to have different patterning shapes, so that an opening 501K1 can be formed in the region R1 so as to have an opening pattern corresponding to the plane shape of the main magnetic pole layer 11 to be formed in the succeeding step, as shown in FIG. 8A, and two openings 501K2 can be formed in the region R2B so as to have an opening pattern corresponding to the plane shape (e.g., a rectangular shape) of the resistive film pattern 301 (the secondary resistive film pattern 301A and the primary resistive film pattern 301B), as shown in FIG. 8B. Considering that a flare point FP is substantially determined based on the opening pattern of the opening 501K1, the opening 501K1 is positioned so that the flare point FP takes up a desired position, and the opening 501K2 is positioned so that the position of the rear end of the resistive film pattern 301 to be formed in the succeeding step (i.e., the edge on the side opposite to the side that becomes the air bearing surface) coincides with the flare point FP. It is however not necessarily required to position the opening 501K2 so that the position of the rear end of the resistive film pattern 301 coincides with the flare point FP. In some cases, the opening 501K2 is positioned to provide a suitable offset S (e.g., $0 \mu m < S \leq 1.0 \mu m$) between the position of the rear end of the resistive film pattern 301 and the flare point FP.

Figure 10A:
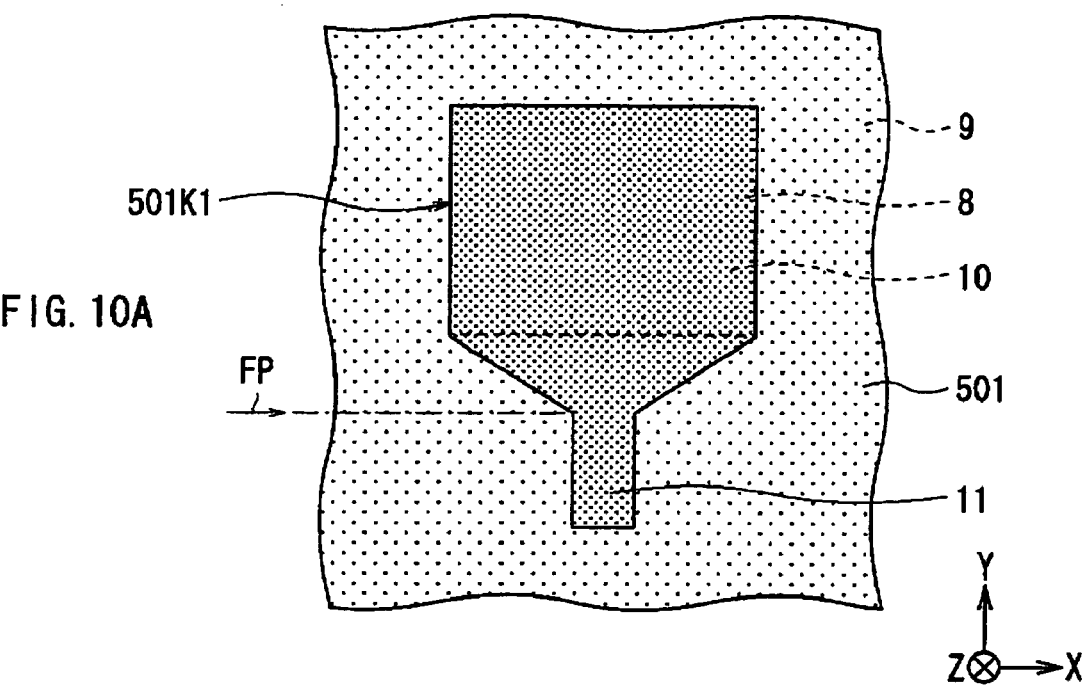
FIGS. 10A and 10B are plan views for explaining the succeeding steps of the steps in FIGS. 9A and 9B.
Figure 10B:
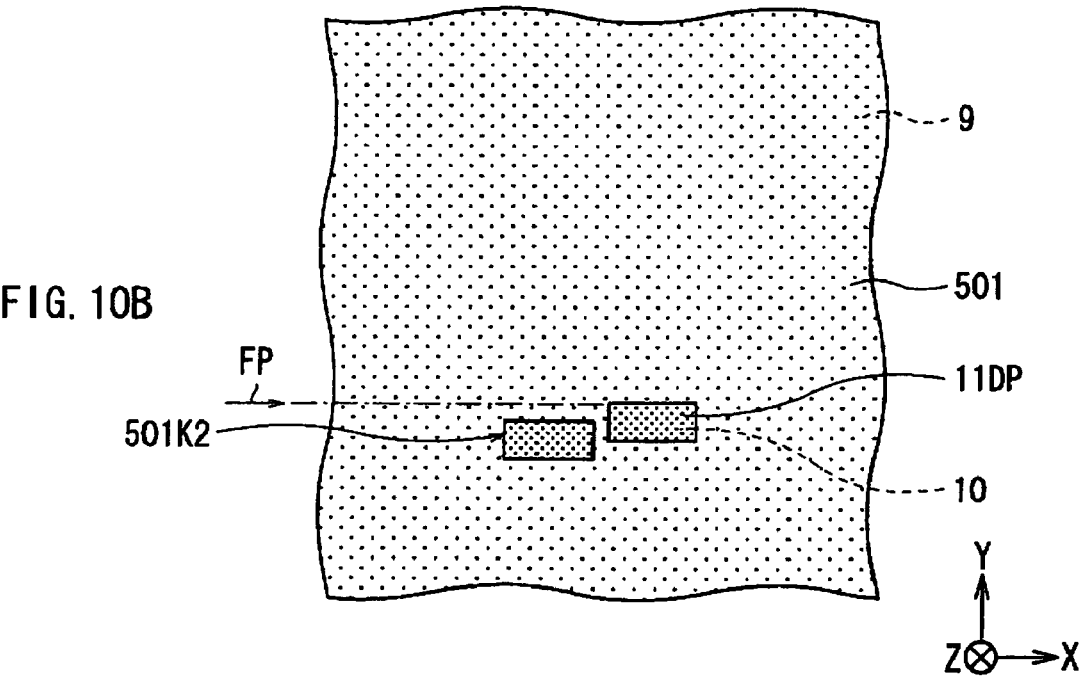

Using the photoresist pattern 501, a plating film is selectively grown within the openings 501K1 and 501K2, with the seed layer 10 as an electrode film. As a result, a pattern formation of the main magnetic pole layer 11 in the opening 501K1 in the photoresist pattern 501 is performed in the region R1, as shown in FIG. 10A, and the formation of a dummy pattern layer 11DP in the opening 501K2 in the photoresist pattern 501 is performed in the region R2B, as shown in FIG. 10B. The dummy pattern layer 11DP is used as a mask in order to etch the seed layer 10 in the succeeding step.

Figure 11A:
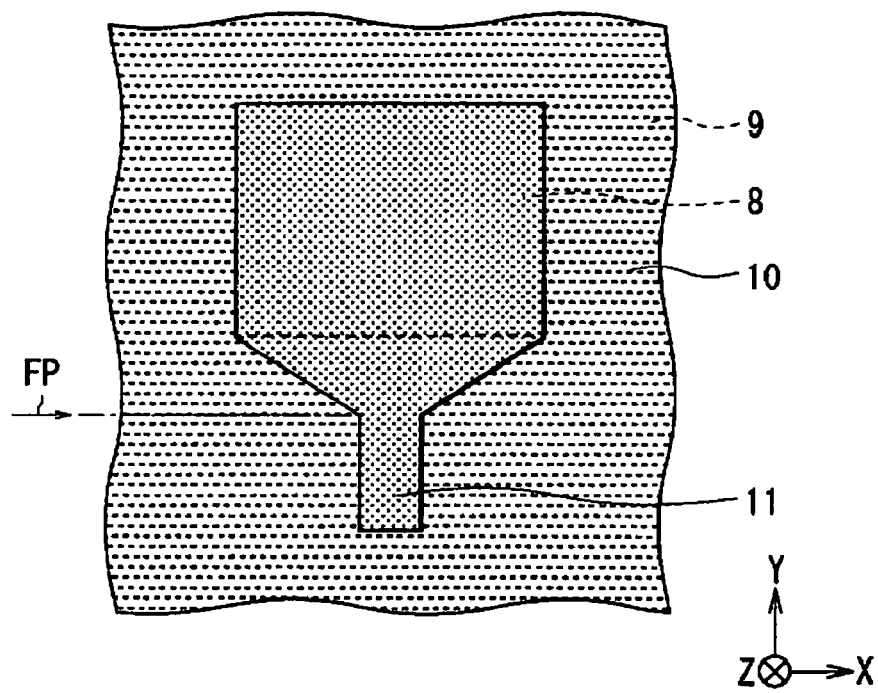
FIGS. 11A and 11B are plan views for explaining the succeeding steps of the step in FIGS. 10A and 10B.
Figure 11B:
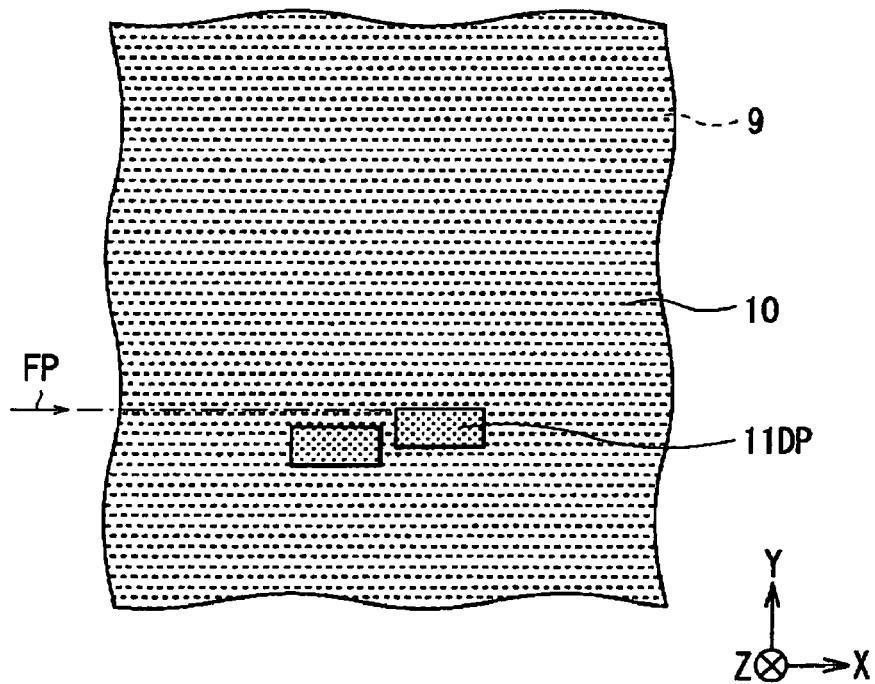

The photoresist pattern 501 is then removed to expose the seed layer 10 around the main magnetic pole layer 11 and the dummy pattern layer 11DP in the regions R1 and R2B, as shown in FIGS. 11A and 11B, respectively.

Figure 12A:
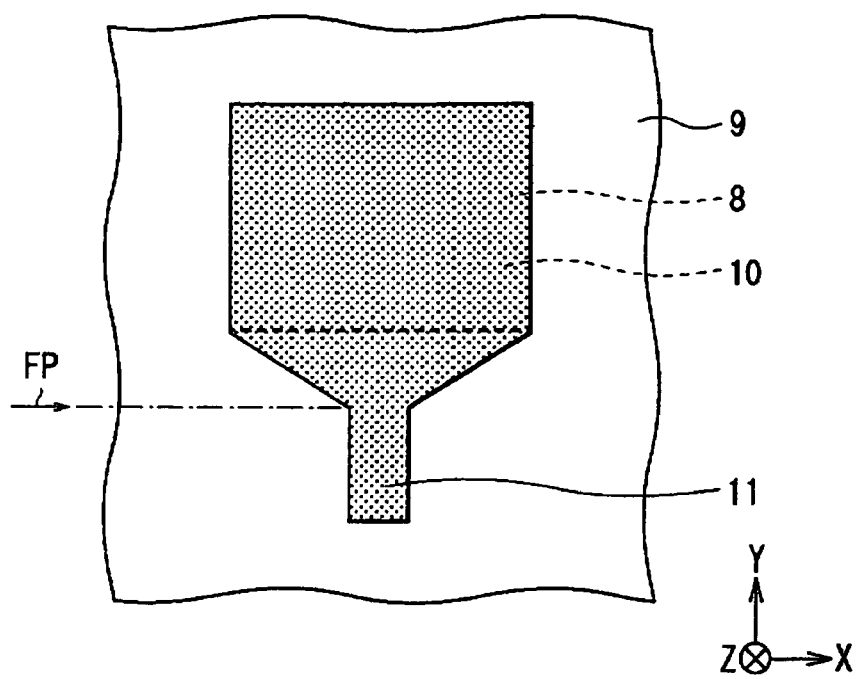
FIGS. 12A and 12B are plan views for explaining the succeeding steps of the step in FIGS. 11A and 11B.
Figure 12B:
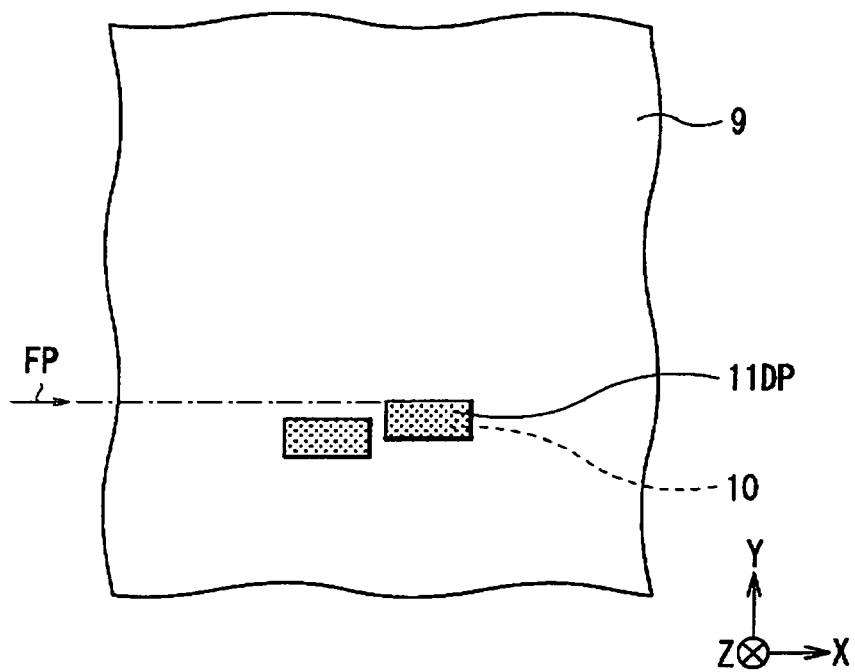

Thereafter, with both of the main magnetic pole layer 11 and the dummy pattern layer 11DP as masks, the seed layer 10 is selectively etched with an ion milling, for example, so that the circumferential portions of the main magnetic pole layer 11 and the dummy pattern layer 11DP in the seed layer 10 are selectively removed, as shown in FIGS. 12A and 12B. As a result of this etching process, the seed layer 10 having a pattern shape corresponding to the plane shape of the main magnetic pole layer 11 remains only at a region corresponding to the pattern shape of the main magnetic pole layer 11 in the region R1, as shown in FIG. 12A, and the seed layer 10 having a pattern shape corresponding to the plane shape of the dummy pattern layer 11DP remains only in a region corresponding to the pattern shape of the dummy pattern layer 11DP in the region R2B, as shown in FIG. 12B.

Figure 13A:
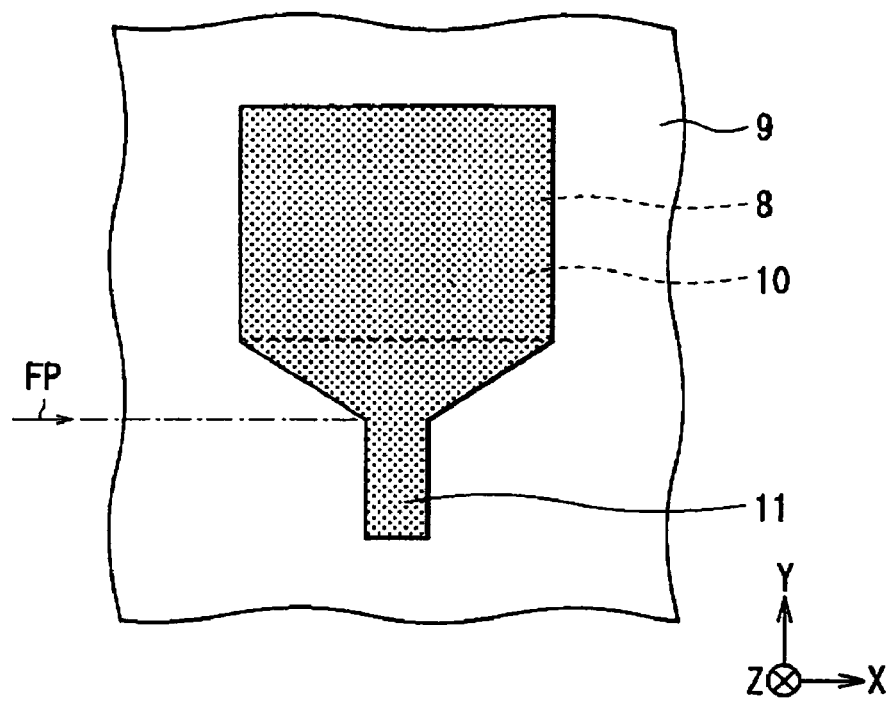
FIGS. 13A and 13B are plan views for explaining the succeeding steps of the step in FIGS. 12A and 12B.
Figure 13B:
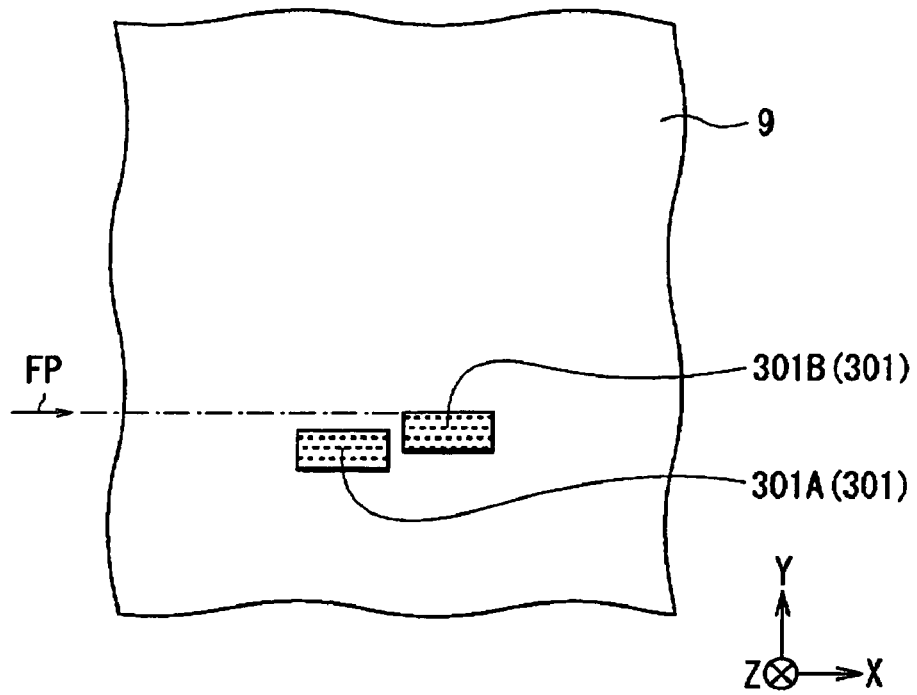

Finally, as shown in FIGS. 13A and 13B, the dummy pattern layer 11DP is selectively removed while allowing the seed layer 10 to remain in the region R2B with the main magnetic pole layer 11 maintained in the region R1. This enables the seed layer 10 and the main magnetic pole layer 11 to be formed in the region R1, as shown in FIG. 13A. As a result, the magnetic pole layer 20 can be formed so as to have the three-layer structure that the auxiliary magnetic pole layer 8, the seed layer 10 and the main magnetic pole layer 11 are laminated in this order, as shown in FIG. 5, and the resistive film pattern 301 (the secondary resistive film pattern 301A and the primary resistive film pattern 301B) can be formed as a remaining portion of the seed layer 10 in the region R2B, as shown in FIG. 13B.

The steps of forming the laminate structure 111 and the resistive film sensors 201 and 301 will be continuously described. After forming the magnetic pole layer 20 and the resistive film pattern 301, the write head core 111B is formed so as to have a laminate structure extending from the insulating layers 9 and 12 and the magnetic pole layer 20 to the light shield layer 30 by laminating the gap layer 13 provided with the back gap 13BG, the insulating layer 16 with the thin film coil 15 buried therein, and the light shield layer 30 (the TH defining layer 14 and the yoke layer 17) in this order on the main magnetic pole layer 11 and the insulating layer 12 in the region R1, as shown in FIGS. 2, 5 and FIG. 6A. As shown in FIGS. 6B and 6C, the gap layer 13 and the insulating layer 16 are also laminated by forming them side by side in the regions R2A and R2B, along with the region R1.

Finally, as shown in FIGS. 2, 5 and 6A, the overcoat layer 18 is formed so as to cover the write head core 111B in the region R1 by using sputtering, for example. Specifically, as shown in FIGS. 6B and 6C, the overcoat layer 18 is laminated by forming it side by side in the regions R2A and R2B, along with the region R1. As a result, the laminate structure 111 can be formed so as to include the write head core 111A and the read head core 111B, thereby completing the laminate structure 111 and the resistive film sensors 201 and 301.

Thus, in the thin film magnetic head integrated structure and the method of manufacturing thereof according to this embodiment, the element forming surface 101M of the wafer 101 is provided with the plurality of thin film magnetic head precursors 110 as precursors for forming the thin film magnetic head, the plurality of RLG sensors 200 for read head core that are arranged in the same layer as the read head core 111A, and the plurality of RLG sensors 300 for write head core that are arranged in the same layer as the write head core 111B. Accordingly, the manufacturing of the thin film magnetic head by using the thin film magnetic head integrated structure 100 together with the a later-described method of manufacturing a thin film magnetic head can contribute to high-accuracy determinations of the MR height and the neck height.

Specifically, in this preferred embodiment, the resistive film pattern 201 of each of the RLG sensors 200 for read head core and the resistive film pattern 301 of each of the RLG sensors 300 for write head core are disposed at different hierarchies. More specifically, the resistive film pattern 201 is arranged in the same layer as the MR element 6 of the read head core 111A, and the resistive film pattern 301 is arranged in the same layer as the magnetic pole layer 20 (the seed layer 10) of the write head core 111B. Hence, when the thin film magnetic head integrated structure 100 is subjected to the grinding process for forming the air bearing surface, the RLG sensors 200 for read head core and the RLG sensors 300 for write head core can be used to separately detect the progress of the grinding process to the read head core 111A and the progress of the grinding process to the write head core 111B. It is therefore possible to perform the grinding process so that both of the MR height and the neck height can finally be their respective desired sizes. This permits contributions to the high-accuracy determinations of the MR height and the neck height.

In particular, in this embodiment, when the MR element 6 is formed in the region R1 in the element forming surface 101M of the wafer 101, the step of forming the MR element 6 is utilized to form the resistive film pattern 201 in the region R2A in parallel with the MR element 6, enabling the MR element 6 and the resistive film pattern 201 to be formed in a single step. This permits a reduction in the number of steps needed to manufacture the thin film magnetic head integrated structure 100 compared to the case where the resistive film pattern 201 is formed independently from the step of forming the MR element 6, namely where the two steps are required. Hence, the thin film magnetic head integrated structure 100 can be easily manufactured.

Further, in this embodiment, when the magnetic pole layer 20 is formed in the region R1 in the element forming surface 101M of the wafer 101, the step of forming the magnetic pole layer 20 is utilized to form the resistive film pattern 301 in the region R2B in parallel with the magnetic pole layer 20 (the seed layer 10), enabling the magnetic pole layer 20 and the resistive film pattern 301 to be formed in a single step. Therefore, compared to the case where the step for forming the resistive film pattern 301 is necessary independently from the step for forming the magnetic pole layer 20, no dedicated step for forming the resistance pattern 301 is necessary. Similarly to the case where the step for forming the MR element 6 is utilized to form the resistive film pattern 201, the number of steps needed to manufacture the thin film magnetic head integrated structure 100 can be reduced. From the point of view of this, the thin film magnetic head integrated structure 100 can also be easily manufactured.

In the forgoing embodiment, as shown in FIGS. 2 and 3, in the region R2 in the element forming surface 101M of the wafer 101, the RLG sensors 200 for read head core and the RLG sensors 300 for write head core are alternately disposed. Specifically, the RLG sensors 200 for read head core is disposed in the region R2A, and the RLG sensors 300 for write head core is disposed in the region R2B by way of example and without limitation. The arrangements (the arrangement patterns and the arrangement number) of the RLG sensors 200 for read head core and the RLG sensors 300 for write head core can be freely changed. As an example, instead of alternately disposing the RLG sensors 200 for read head core and the RLG sensors 300 for write head core in the region R2, both of the sensors 200 and 300 may be disposed in the region R2, thus leading to the same effect as in the foregoing embodiment.

This terminates the descriptions of the thin film magnetic head integrated structure and the method of manufacturing thereof according to the above embodiment of the present invention.

Figure 14:
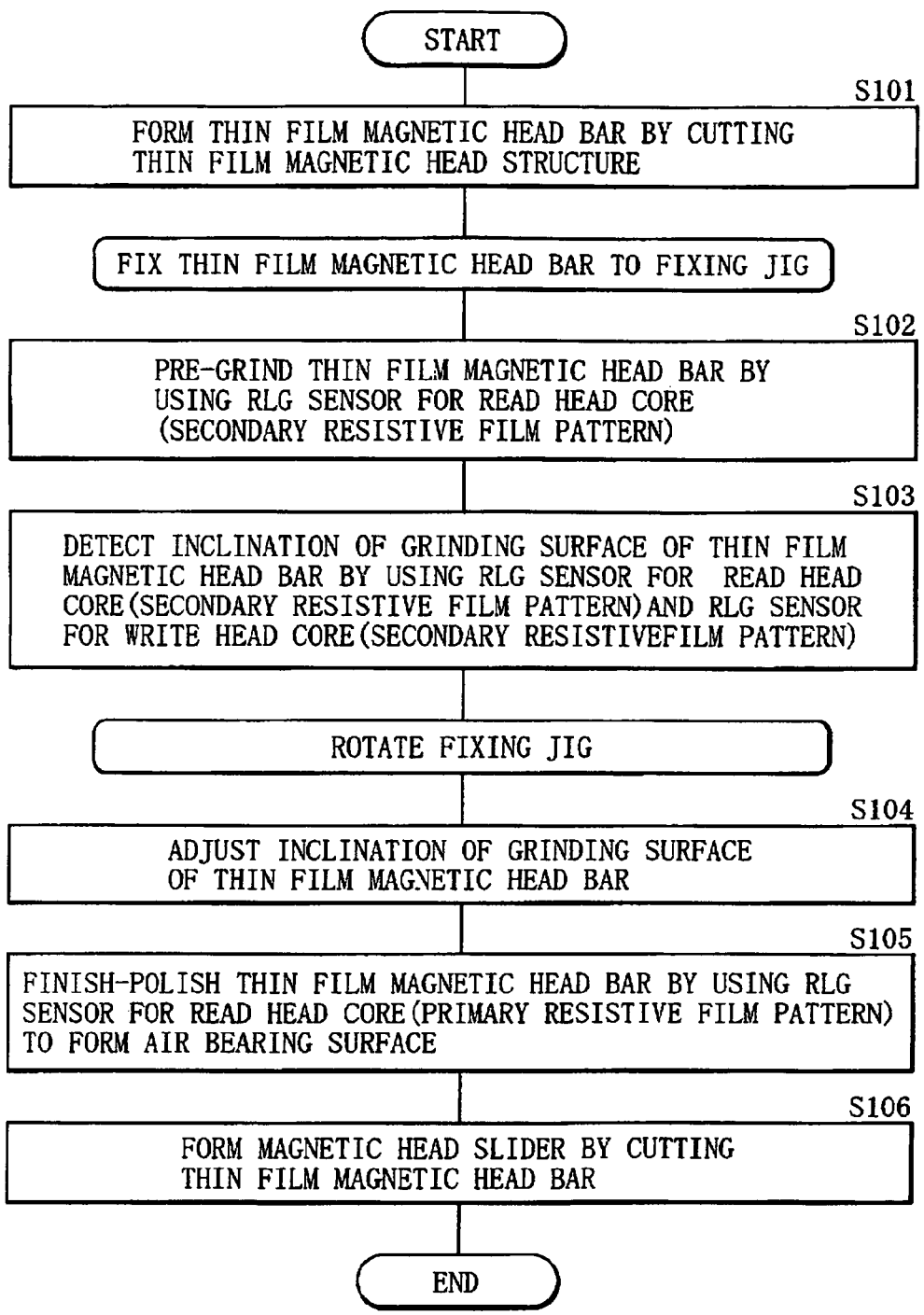
FIG. 14 is a flow chart for explaining the flow of a method of manufacturing a thin film magnetic head of the present invention.
Figure 15:
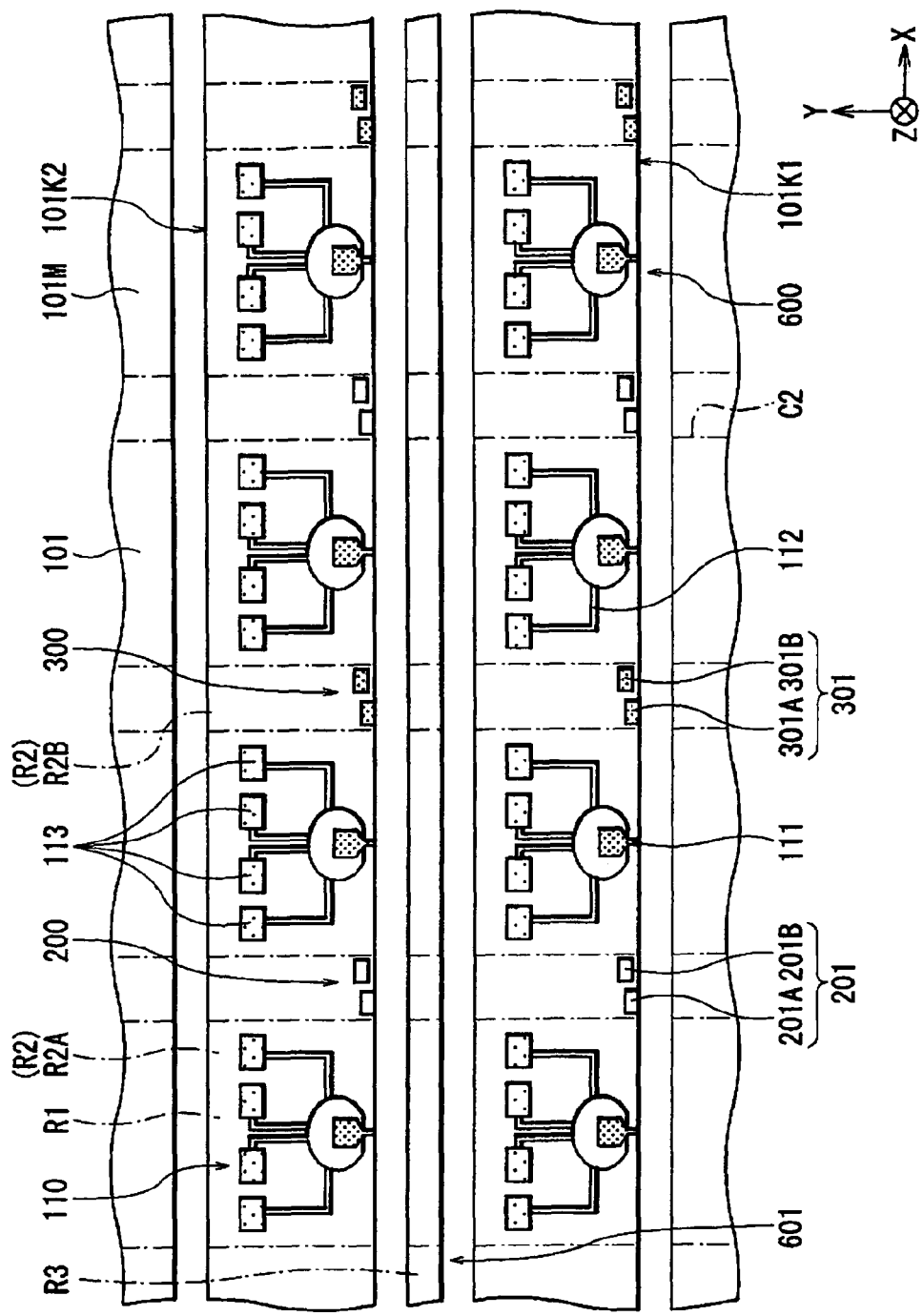
FIG. 15 is a plan view for explaining a specific manufacturing procedure of a thin film magnetic head.
Figure 18:
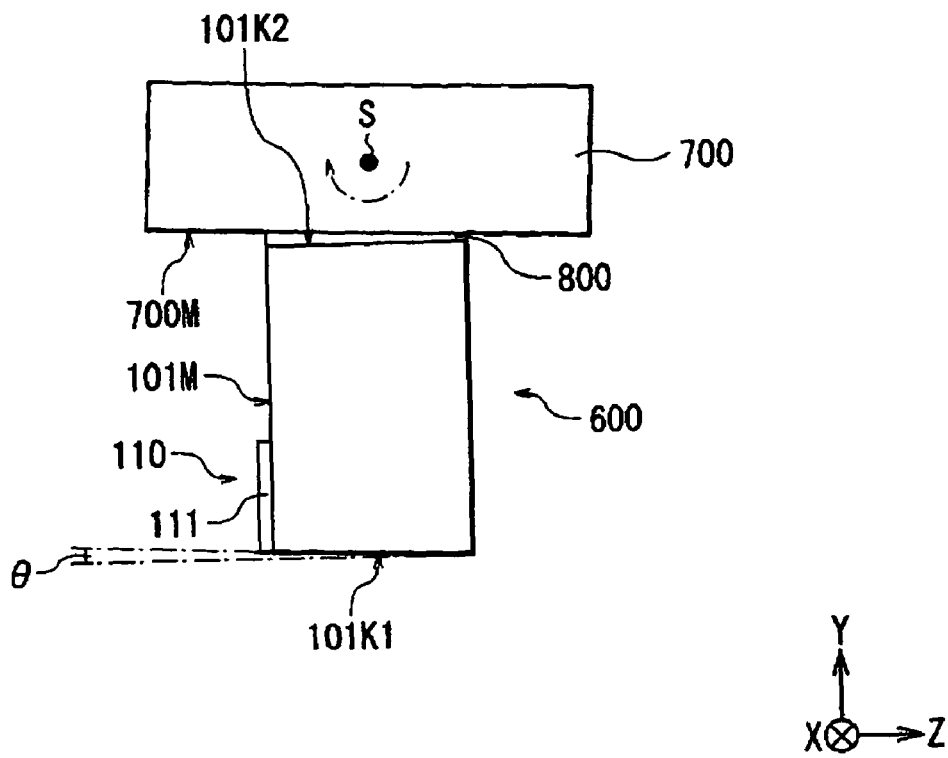
FIG. 18 is a side view for explaining a manufacturing procedure that follows the procedure in FIG. 17.
Figure 19:
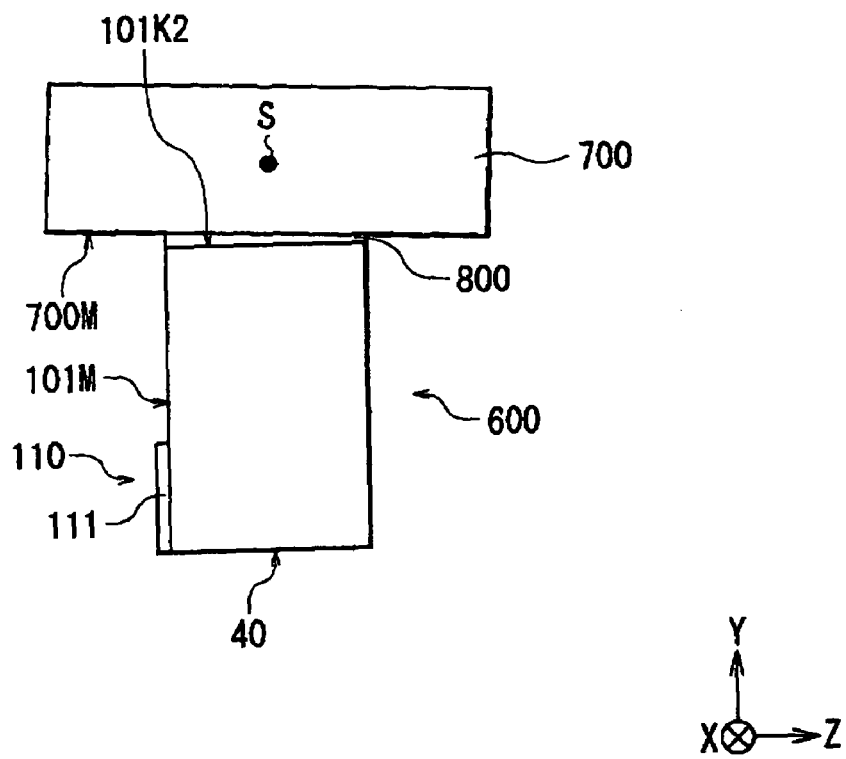
FIG. 19 is a side view for explaining a manufacturing procedure that follows the procedure in FIG. 18.
Figure 20:
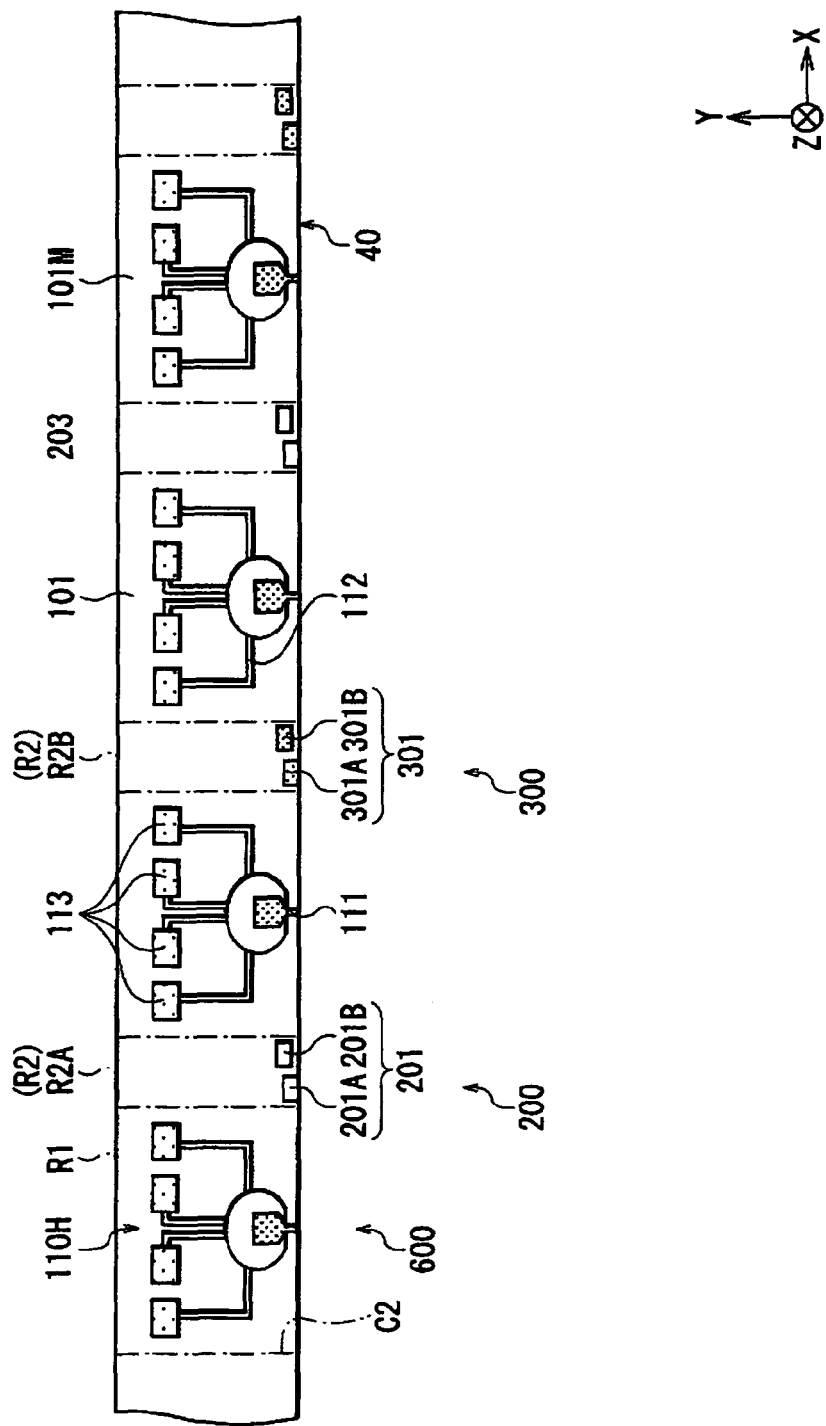
FIG. 20 is a plan view corresponding to a side configuration in FIG. 19.
Figure 21:
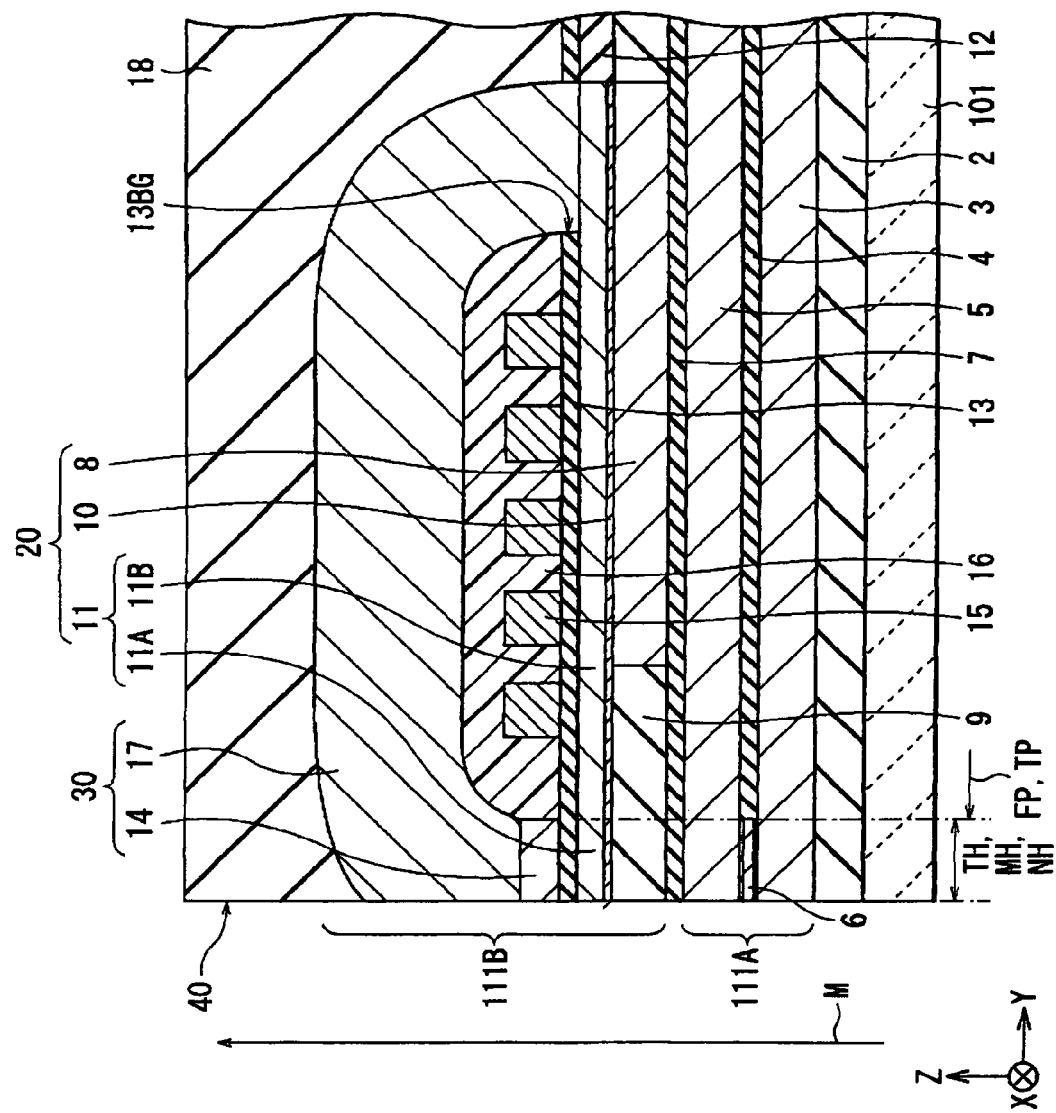
FIG. 21 is a sectional view illustrating a sectional configuration (a sectional configuration along a YZ plane) of a thin film magnetic head manufactured with the method of manufacturing a thin film magnetic head of the present invention.
Figure 22:
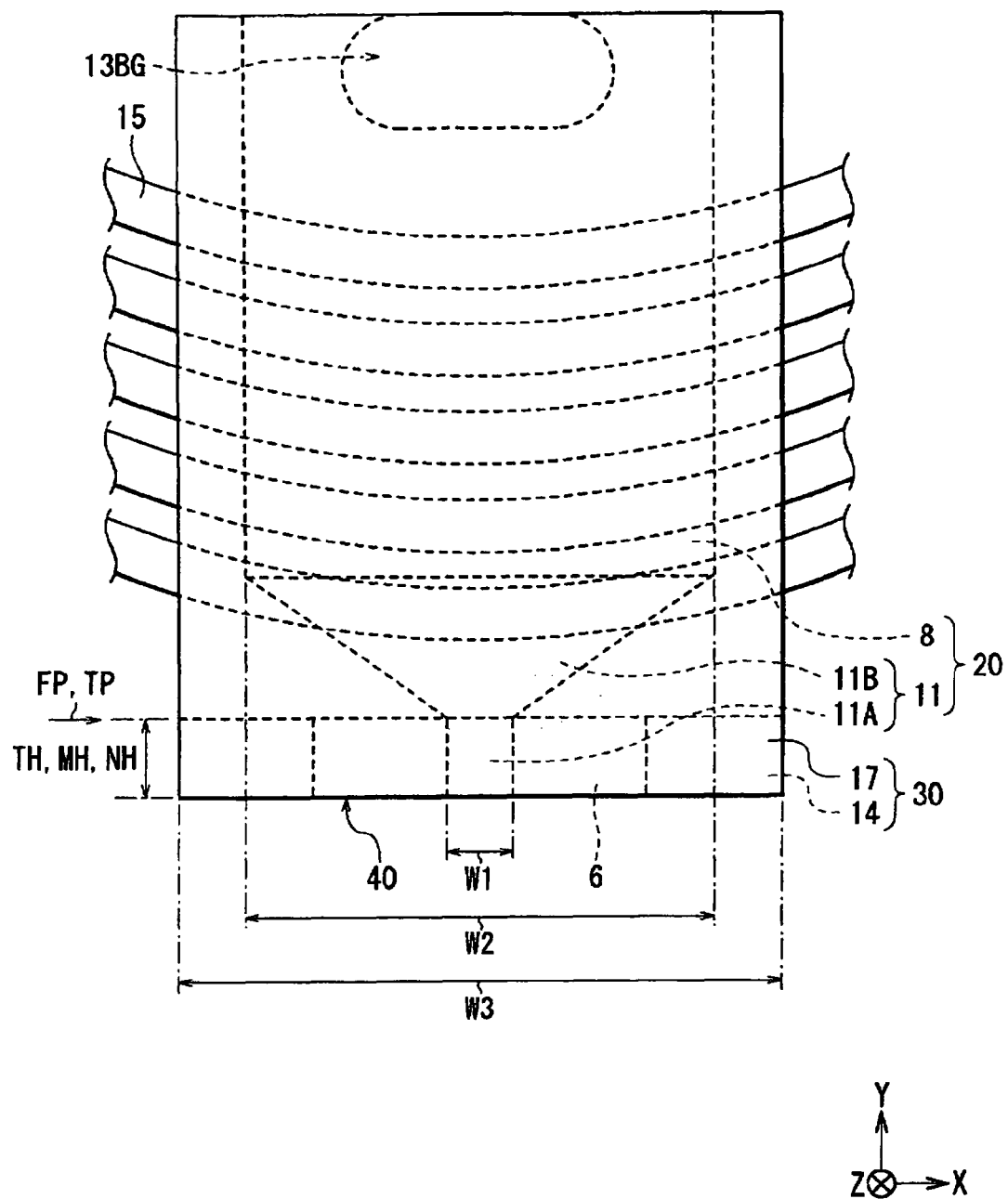
FIG. 22 is a plan view illustrating a planar configuration (a planar configuration when viewed from the Z-axis direction) of the thin film magnetic head in FIG. 21.
Figure 23:
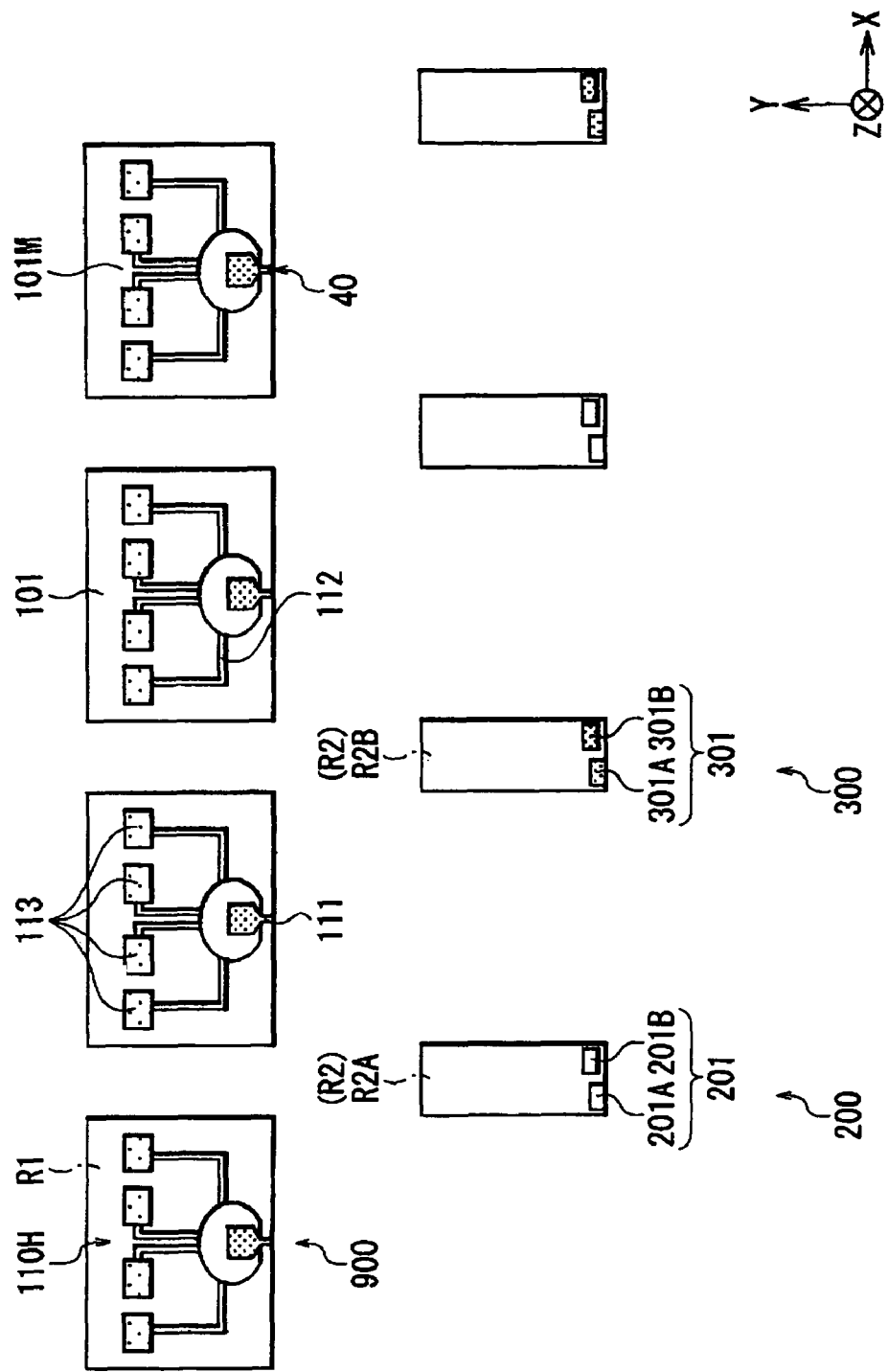
FIG. 23 is a plan view for explaining a manufacturing procedure that follows the procedure in FIG. 20.
Figure 24:
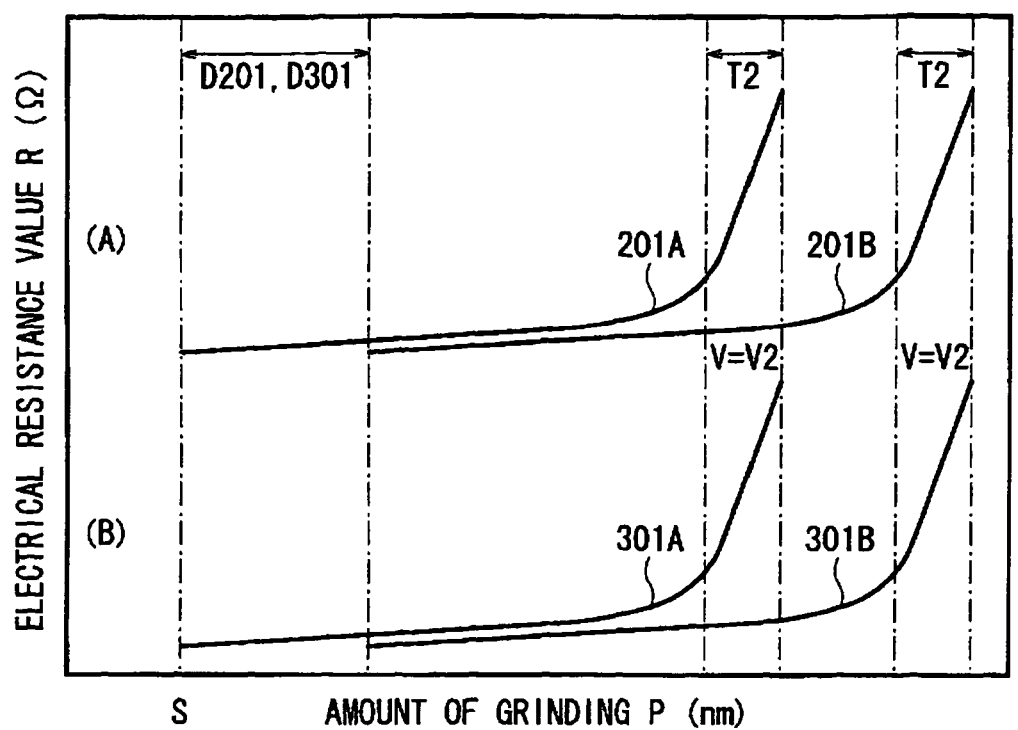
FIG. 24 is diagram illustrating the correlation between the amount of grinding and the electrical resistance values in the method of manufacturing a thin film magnetic head of the present invention.

Next, a method of manufacturing a thin film magnetic head using the thin film magnetic head integrated structure of the present invention will be described with reference to FIGS. 1 to 24B. FIGS. 14 to 24B illustrate the method of manufacturing a thin film magnetic head. FIG. 14 illustrates the flow of the manufacturing steps of the thin film magnetic head. FIGS. 15 to 23 illustrate a specific manufacturing procedure of the thin film magnetic head. FIG. 24 shows the correlation between the amount of grinding and the electrical resistance values in the manufacturing steps of the thin film magnetic head (i.e., the correlation corresponding to FIG. 4C). FIGS. 15, 20 and 23 illustrate planar configurations corresponding to FIG. 2. FIG. 21 illustrates a sectional configuration corresponding to FIG. 5. FIG. 22 illustrates a planar configuration corresponding to FIG. 7. (A) in FIG. 24 illustrates the correlation related to the RLG sensors 200 for read head core (the secondary resistive film pattern 201A and the primary resistive film pattern 201B). (B) in FIG. 24 illustrates the correlation related to the RLG sensors 300 for write head core (the secondary resistive film pattern 301A and the primary resistive film pattern 301B). In (A) in FIG. 24, a shift between the curves (201A and 201B) that represent the variations in the electrical resistance values R corresponds to the amount of offset (namely the recession distance D201). In FIG. 24B, a shift between the curves (301A and 301B) that represent the variations in the electrical resistance values R corresponds to the amount of offset (namely the recession distance D301).

When manufacturing the thin film magnetic head, firstly, the thin film magnetic head integrated structure 100 as shown in FIGS. 1 to 7 is prepared, and a plurality of thin film magnetic head bars 600 are formed as shown in FIG. 15, by cutting the thin film magnetic head integrated structure 100 along the cutting line C1 as shown in FIG. 2 (refer to FIG. 14, step S101). The thin film magnetic head bars 600 are of a bar-shaped structure, which can be formed by dividing the thin film magnetic head integrated structure 100 into a plurality of pieces along the cutting line C1. The respective thin film magnetic head bars 600 are disposed in a series of regions R1 and then subjected to grinding process in the succeeding step. As a result, they are formed so as to include a plurality of thin film magnetic head precursors 110 that become later-described thin film magnetic head 110H (refer to FIG. 20), a plurality of RLG sensors 200 for read head core (resistive film sensors 201) that are disposed in a series of regions R2A and used to control the progress of the grinding process to the read head core 111A (refer to FIG. 5), and a plurality of RLG sensors 300 for write head core (resistive film sensors 301) that are disposed in a series of regions R2B and used to control the progress of the grinding process to the write head core 111B (refer to FIG. 5). Although not illustrated in FIG. 15, each of the thin film magnetic head bars 600 is formed so as to include, for example, the above-mentioned thin film magnetic head precursor 110, the RLG sensors 200 for read head core, and the RLG sensor 300 for write head core, and is arranged so that some of the regions R2A include the M sensor 400 (refer to FIG. 3) instead of the RLG sensors 200 for read head core.

After forming the thin film magnetic head bars 600, two surfaces (cut surfaces) are formed on the thin film magnetic head bars 600. One surface to which the laminate structure 111 and the resistive film sensors 201 and 301 are exposed is the cut surface 101K1 that becomes the air bearing surface by the grinding process to be performed in the succeeding step. The other surface to which the laminate structure 111 and the resistive film sensors 201 and 301 are not exposed is the cut surface 101K2 that is used to fix the thin film magnetic head bars 600 in the succeeding step. The portion (the region R3, an excess bar 601) formed between the thin film magnetic head bars 600 is an unnecessary portion that is not used in the succeeding step and hence discarded as needed.

Figure 16:
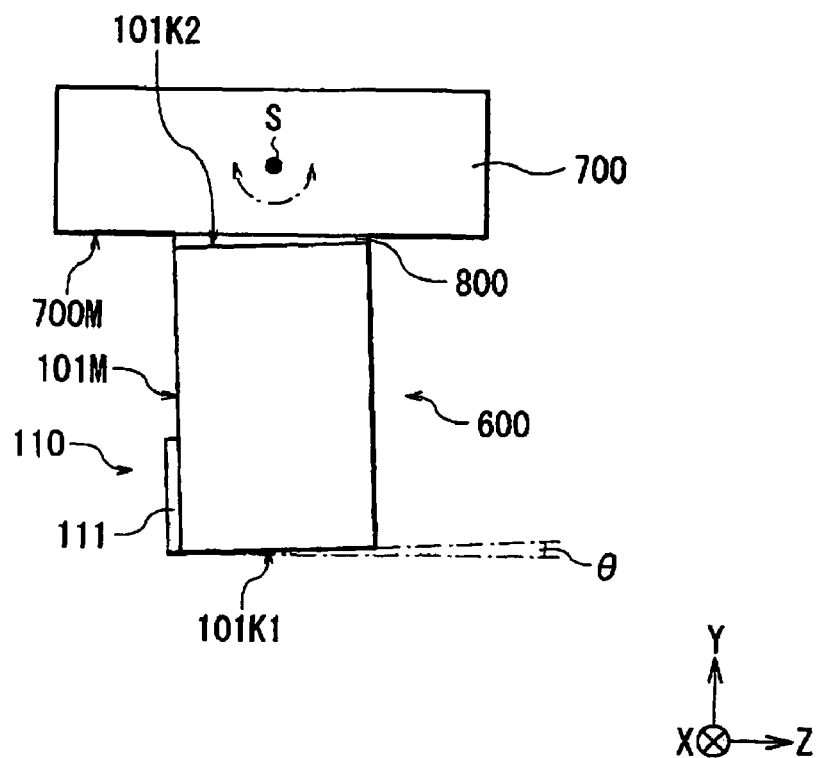
FIG. 16 is a side view for explaining a manufacturing procedure that follows the procedure in FIG. 15.
Figure 17:
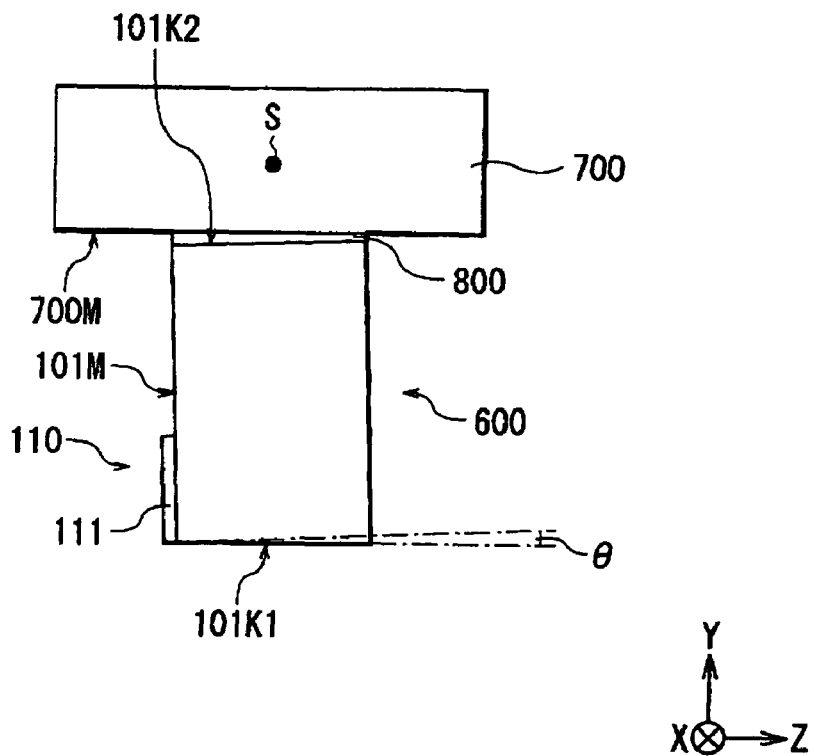
FIG. 17 is a side view for explaining a manufacturing procedure that follows the procedure in FIG. 16.

Subsequently, in order to form the air bearing surface by performing a grinding process of the thin film magnetic head bars 600, the thin film magnetic head bars 600 are fixed with a fixing jig. Specifically, the cut surfaces 101K2 of each of the thin film magnetic bars 600 is adhered via adhesive 800 to one surface of the fixing jig 700 (a fixed surface 700M) as shown in FIG. 16, so that the thin film magnetic head bars 600 are fixed to the fixing jig 700. FIG. 16 illustrates a side configuration when the thin film magnetic head bar 600 is fixed to the fixing jig 700. Similarly, later-described FIGS. 17 to 19 illustrate side configurations corresponding to FIG. 16, respectively. The fixing jig 700 is used to fix the thin film magnetic head bar 600 during the grinding process, and provided with, for example, a screw for adjusting the angle (not shown) so as to be rotatable around an axis of rotation (an axis parallel to the X-axis) S by the operation of the screw. When the thin film head bar 600 is fixed to the fixing jig 700, for example, a two-sided tape is used as the adhesive 800. FIG. 16 illustrates a case where, due to man-caused factor, the cut surface 101K1 of the thin film magnetic head bar 600 happens to incline at an angle (an angle of inclination) θ to the fixed surface 700M of the fixing jig 700, when adhering the thin film head bar 600 to the fixing jig 700 by the adhesive 800.

Subsequently, as shown in FIGS. 18 to 20, electrical resistance values R1 (first electrical resistance values) between the resistive film sensors 201 or between the resistive film sensors 301, and electrical resistance values R2 (second electrical resistance values) between the resistive film pattern 201 and the resistive film pattern 301 are detected by using the plurality of RLG sensors 200 for read head core and the plurality of RLG sensors 300 for write head core which are disposed at the thin film magnetic head bars 600. Under control of the progress of a grinding process based on the detected electrical resistance values R1 and R2, the wafer 101 of the thin film magnetic head bar 600 and the thin film magnetic head precursor 110 are ground to form the air bearing surface 40, thereby forming a thin film magnetic head 110H. Specifically, the thin film magnetic head bar 600 is ground while detecting the amount of grinding based on the variations in the electrical resistance values R1 and R2 according to the amount of grinding. With reference to FIG. 5, based on the electrical resistance values R1 and R2, the read head core 111A is ground so that the size (the so-called MR height) of the MR element 6 becomes a predetermined size, and the write head core 111B is ground so that the size (the so-called neck height) of the tip portion 11A of the magnetic pole layer 20 becomes a predetermined size. The above-mentioned operation for detecting the electrical resistance values R1 and R2 is carried out by utilizing the arithmetic processing of a computer. The details of the grinding process are as follows.

That is, as shown in FIG. 17, the thin film magnetic head bar 600 is firstly pre-ground while detecting the electric resistance between the secondary resistive film sensors 201A, as the electrical resistance values R1, by using the secondary resistive film pattern 201A that is positioned close to the cut surface 101K1 in the plurality of RLG sensors 200 for read head core (the resistive film pattern 201) (step S102 in FIG. 14). More specifically, by grinding the cut surface 101K1 of the thin film magnetic head bar 600, the laminate structure 111 and the secondary resistive film pattern 201A of the thin film magnetic head precursor 110 are also ground along with the wafer 101. By the grinding process of the cut surface 101K1 of the thin film magnetic head bar 600, of course, the M sensor 400 and the secondary resistive film pattern 301A of the RLG sensors 300 for write head core (the resistive film pattern 301) are also ground along with the above-mentioned secondary resistive film pattern 201A. As used herein, the term "pre-grinding" is different from fine grinding (later-described finish-polishing) to complete the air bearing surface 40, and it means rough grinding performed as a preparation for the fine grinding. In FIG. 24, the character "S" in the abscissa indicates the start point of pre-grinding.

When pre-grinding the thin film magnetic head bar 600, the progress of the grinding process is controlled so that the electrical resistance values of the respective secondary resistive film sensors 201A are equalized by detecting, with the use of the series of the RLG sensors 200 for read head core, the electrical resistance values R1 (the electrical resistance values between the secondary resistive film sensors 201A) at the respective positions of the thin film magnetic head bars 600 (the positions where the RLG sensors. 200 for read head core are disposed). More particularly, the amount of grinding is adjusted so that the electrical resistance values of the secondary resistive film sensors 201A are equal to each other in the direction of arrangement of the plurality of thin film magnetic head precursors 110, by utilizing the phenomenon that when the secondary resistive film sensors 201 are ground and its size is changed, the electrical resistance values of the respective secondary resistive film sensors 201 are changed according to the size change. In the pre-grinding, the correlation between the amount of grinding P and the electrical resistance values R, as shown in FIG. 4C, is reflected and therefore, as shown in FIG. 24, as the grinding process proceeds (the amount of grinding P of the thin film magnetic head bar 600 is increased), the electrical resistance values R of the secondary resistive film patterns 201A are increased gradually and the electrical resistance values R of the secondary resistive film patterns 301A are also increased. In this case, the electrical resistance values R1 are detected especially in a grinding state (a range T2) in which the change rates V of the secondary resistance patterns 201A shift change rates V2.

In this pre-grinding process, for example, when a desired size of the MR height of the read head core 111A is HM1 in the completed thin film magnetic head 110H, the thin film magnetic head bar 600 is subjected to grinding process until the MR height MH becomes a preliminary size HM0 larger than the desired size HM1 (HM0>HM1), based on the electrical resistance values of the respective secondary resistive film sensors 201A. As described above, when the secondary resistive film pattern 201A is ground, the secondary resistive film pattern 301A is also ground. Therefore, on the assumption that the secondary resistive film pattern 301A is ground by the same amount as the amount of grinding of the secondary resistive film pattern 201A, when a desired size of the neck height NH of the write head core 111B is HN1 in the completed thin film magnetic head 110H, the neck height NH should be a preliminary size HN0 larger than the desired size HN1 (HN0>HN1). This pre-grinding process suppresses variations in the amount of grinding with respect to the read head core 111A in between the thin film magnetic head precursors 110.

A specific grinding procedure using the plurality of RLG sensors 200 for read head core will be briefly described with reference to FIG. 3. That is, as shown in FIG. 3, when the secondary resistive film pattern 201A1 has a resistance R1, a width W1, and a height H1, and the secondary resistive film pattern 201A2 has a resistance R2, a width W2 (=W1), and a height H2 (=H1−10 μm), and the secondary resistive film pattern 201A3 has a resistance R3, a width W3 (=W1+10 μm), and a height H3 (=H1−10 μm), the resistances R1, R2, and R3 can be expressed as follows:

$R1=RL+(C+S\times W1)/H1;$ $R2=RL+(C+S\times W1)(H1-10);$ and $R3=RL+(C+S\times W1+S\times 10)(H1-10),$ wherein RL is a lead resistance, C is a crowding resistance, and RS is a sheet resistance. In this case, the following relationships for the lead resistance RL, the sheet resistance S, and the virtual resistance RV (=C+S×W1) can be obtained by solving three-size simultaneous equations for the above-mentioned resistances R1, R2, and R3. That is, $RL=R1+(H1-10)(R1-R2)/10;$ $S=(H1-10)(R3-R2)/10;$ and $RV(=C+S\times W1)=-H1(H1-10)(R1-R2)/10$ Therefore, the lead resistance RL, the sheet resistance S, and the virtual resistance RV are known before the grinding process. Accordingly, there is normally the relationship of R1=RL+RV/MH among the electrical resistance value R1, and the lead resistance RL, the virtual resistance RV and the MR height MH, each of which can be detected with the plurality of RLG sensors 200 for read head core. With the use of this relationship, the MR height MH can be calculated by detecting the electrical resistance value R1 when the lead resistance RL and the virtual resistance RV are known. Thus, if the MR height MH is calculated by detecting the electrical resistance values R1 at predetermined time intervals during the grinding process, it is possible to perform the grinding process while detecting the MR height MH in the course of the grinding. This enables the grinding process to be formed up to a predetermined amount of grinding. The process of calculating the MR height MH is carried out by utilizing the arithmetic processing of a computer, as described above.

The method of manufacturing the thin film magnetic head will be continuously described. After the pre-grinding of the thin film magnetic head bar 600, the inclination of the grinding surface of the thin film magnetic head bar 600 is detected by detecting the electrical resistance values between the secondary resistive film pattern 201A and the secondary resistive film pattern 301A as an electrical resistance values R2, by using the secondary resistive film pattern 201A that is positioned close to the cut surface 101K1 in the plurality of RLG sensors 200 for read head core (the resistive film pattern 201), and the secondary resistive film pattern 301A that is positioned close to the cut surface 101K1 in the plurality of RLG sensors 300 for write head core (resistive film pattern 301) (step S103 in FIG. 14). As used herein, the expression "the inclination of the grinding surface of the thin film magnetic head bar 600" means the inclination of the thin film magnetic head bar 600 caused by the angle of inclination θ as shown in FIG. 16 (the inclination of the grinding surface (the cut surface 101K1) with respect to a reference surface (the cut surface 101K2), and it becomes a factor causing an amount of deviation of the neck height NH (an amount of deviation with respect to the preliminary size HN0). When detecting the inclination of the grinding surface of the thin film magnetic head bar 600, as shown in FIG. 24, the electrical resistance values R1 are detected in a grinding state that the secondary resistive film pattern 201A exhibits change rates V2 (namely in the range T2), and the electrical resistance values R2 are also detected in a grinding state that the secondary resistive film pattern 301A exhibits the change rates V2 (namely in the range T2).

When detecting the inclination of the grinding surface of the thin film magnetic head bar 600, the electrical resistance values R2 between the individual secondary resistive film pattern 201A and the individual secondary resistive film pattern 301A are detected by using, for example, the series of RLG sensors 200 for read head core and the RLG sensors 300 for write head core. Then, the inclined state of the attitude of the thin film magnetic head bar 600 is detected based on the electrical resistance values R2. More specifically, a difference between the amount of grinding of the read head core 111A and the amount of grinding of the write head core 111B is calculated based on the electrical resistance values R2, and then the angle of inclination θ of the thin film magnetic had bar 600 is specified based on the difference. For example, when the thin film magnetic head bar 600 is pre-ground as shown in FIG. 17, in a state in which the thin film magnetic head bar 600 is inclined at an angle of inclination θ as shown in FIG. 16, the amount of grinding of the laminate structure 111 becomes excessive on the trailing side (the write head core 111B side) than the leading side (the read head core 111A side), so that the amount of grinding of the read head core 111A is larger than the amount of grinding of the write head core 111B.

Subsequently, the inclination of the grinding surface of the thin film magnetic head bar 600 is adjusted by adjusting the attitude of the thin film magnetic head bar 600 based on the angle of inclination θ (step S104 in FIG. 14).

When adjusting the inclination of the grinding surface of the thin film magnetic head bar 600, the fixing jig 700 is rotated around the axis of rotation S to change the attitude of the thin film magnetic-head bar 600 so that, when the grinding process of the thin film magnetic head bar 600 is continued in the succeeding step, the MR height MH of the read head core 111A will eventually be the desired size HM1, and the neck height NH of the write head core 111B will eventually be the desired size HN1. As shown in FIG. 17, the cut surface 101K1 of the thin film magnetic head bar 600 is inclined at an angle of inclination θ with respect to the cut surface 101K2. Therefore, by rotating the fixing jig 700 clockwise through an angle θ in order to cancel the angle of inclination θ, as shown in FIG. 18, the thin film magnetic head bar 600 is intentionally inclined so that the cut surface 101K1 is inclined in the reverse direction (the direction of reverse inclination with respect to the direction of inclination as shown in FIG. 16) through an angle θ with respect to the fixed surface 700M of the fixing jig 700. As an angle of inclination θ, for example, about ±2° can be corrected. For about ±0.5°, the attitude of the thin film magnetic head bar 600 can be controlled with high precision.

Finally, while detecting, as electrical resistance values R1, the electrical resistance values between the individual primary resistance patterns 201B by using the primary resistive film pattern 201B, which is positioned on the side far from the cut surface 101K1 in the plurality of RLG sensors 200 for read head core (the resistive film sensors 201), the thin film magnetic head bar 600 is subjected to finish-polishing as shown in FIG. 19, thereby forming the air bearing surface 40 (step S105 in FIG. 14). More specifically, the cut surface 101K1 of the thin film magnetic head bar 600 is continuously ground so as to grind the laminate structure 111 and the primary resistive film pattern 201B in the thin film magnetic head precursor 110, along with the wafer 101. By the grinding process of the cut surface 101K1 of the thin film magnetic head bar 600, of course, the M sensor 400 and the primary resistive film pattern 301B of the RLG sensors 300 for write head core (the resistive film pattern 301) are ground along with the above-mentioned primary resistive film pattern 201B. The term "finish-polishing" as used herein means fine grinding for finishing the air bearing surface 40.

When performing finish-polishing of the thin film magnetic head bar 600, for example, similarly to the pre-grinding of the thin film magnetic head bar 600, the progress of the grinding process is controlled so that the electrical resistance values of the respective secondary resistive film sensors 201B are equalized by detecting the electrical resistance values between the respective primary resistive film sensors 201B by using the series of the RLG sensors 200 for read head core. In the finish-polishing, the correlation between the amount of grinding P and the electrical resistance values R, as shown in FIG. 4C is also reflected and therefore, as shown in FIG. 24, as the grinding process proceeds (the amount of grinding P is increased), the electrical resistance values R of the primary resistive film patterns 201B are increased gradually and, similarly, the electrical resistance values R of the primary resistive film patterns 301B are also increased gradually. In this case, the electrical resistance values R1 are detected especially in the grinding state (the range T2) in which the change rates V of the primary resistance patterns 201B shift the change rates V2.

In the finish-polishing process, the thin film magnetic head bar 600 is subjected to grinding process until the MR height MH of the read head core 111A become the desired size HM1, based on the electrical resistance values of the individual primary resistive film patterns 201B. In this case, with the inclination of the grinding surface of the thin film magnetic head bar 600 adjusted as described above, the write head core 111B are ground along with the read head core 11A. Therefore, at the point that the MR height MH of the read head core 111A is the desired size HM1, the neck height NH of the write head core 111B is also the desired size HN1. That is, the finish-polishing process suppresses variations in the amount of grinding with respect to the read head cores 111A among the thin film magnetic head precursors 110, and also suppresses variations in the amount of grinding between the read head core 111A and the write head core 111B among the thin film magnetic head precursors 110. By the finish-polishing process, the cut surface 101K1 of the thin film magnetic head bar 600 becomes the air bearing surface 40. As shown in FIG. 20, as the thin film magnetic head precursor 110 with the air bearing surface 40 formed thereon, the thin film magnetic head 110H is completed so as to include the read head core 111A and the write head core 111B. The sectional configuration (the sectional configuration along the YZ plane) and the planar configuration (the planar configuration as viewed from the Z-axis direction) of the thin film magnetic head 110H are as shown in FIGS. 21 and 22, respectively.

After completing the thin film magnetic head 110H, the thin film magnetic head bar 600 is cut along the cutting line C2 as shown in FIG. 20, so that a plurality of magnetic head sliders 900 are formed as shown in FIG. 23 (step S106 in FIG. 14). The magnetic head sliders 900 are mounted on magnetic recording devices such as hard disk drives, as a magnetic device that can perform magnetic read process and write process. When the thin film magnetic head bar 600 is cut to form the plurality of magnetic head sliders 900, the used RLG sensors 200 for read head core and the used RLG sensors 300 for write head core, which are separated from the magnetic head sliders 900, are discarded as needed.

In the above-mentioned method of manufacturing a thin film magnetic head, the thin film magnetic head bar 600 is formed by cutting the thin film magnetic head integrated structure 100 as described in the foregoing embodiment. Thereafter, the air bearing surface 40 is formed by performing the grinding process of the thin film magnetic head bar 600, while detecting the electrical resistance values R1 and R2 with the use of the RLG sensors 200 for read head core and the RLG sensors 300 for write head core, thereby forming the thin film magnetic head 110H so as to include both of the read head core 111A and the write head core 111B. Specifically, the thin film magnetic head bar 600 is pre-ground while detecting the electrical resistance values R1 with the use of the secondary resistive film pattern 201A of the RLG sensors 200 for read head core, and the inclination of the grinding surface of the thin film magnetic head bar 600 is adjusted by detecting the electrical resistance values R2 with the continuous use of the secondary resistive film pattern 201A of the RLG sensors 200 for read head core, and the use of the secondary resistive film pattern 301A of the RLG sensors 300 for write head core. Thereafter, the thin film magnetic head bar 600 is finish-ground while detecting the electrical resistance values R1 with the use of the primary resistive film pattern 201B of the RLG sensors 200 for read head core. In particular, the electrical resistance values R1 and R2 are detected in the grinding state that the change rate V of each of the secondary resistive film sensors 201A and 301A, and that of the primary resistive film pattern 301B are the change rate V2.

This enables the electrical resistance values R1 and R2 to be detected with high precision than the case of detecting the electrical resistance values R1 and R2 in the grinding state that the change rate V of each of the secondary resistive film sensors 201A and 301A is the change rate V1. This is because, as apparent from the correlation between the amount of grinding P and the electrical resistance values R as shown in FIG. 4C, the variations in the electrical resistance values R with respect to the variation in the amount of grinding P is increased in the grinding state of the change rate V2 than the grinding state of the change rate V1, thus improving the precision of detection (the sensibility of detection) of the electrical resistance values R. As a result, the progress of the grinding process with respect to the read head core 111A and the write head core 111B can be controlled appropriately in the process of forming the air bearing surface 40 through the grinding process. Therefore, the amount of grinding in the pre-grinding and that in the finish-polishing can be detected with high precision, and the inclination of the grinding surface can be detected and corrected with high precision, so that the MR height MH of the read head core 111A is the desired size HM1, and the neck height NH of the write head core 111B is the desired size HN1. Consequently, when the thin film magnetic head 110H is manufactured by forming the air bearing surface 40, it is possible to determine the MR height MH so as to achieve the desired size HM1, and determine the neck height NH so as to achieve the desired size HN1, permitting high-precision determinations of both of the MR height MH and the neck height NH.

Figure 25:
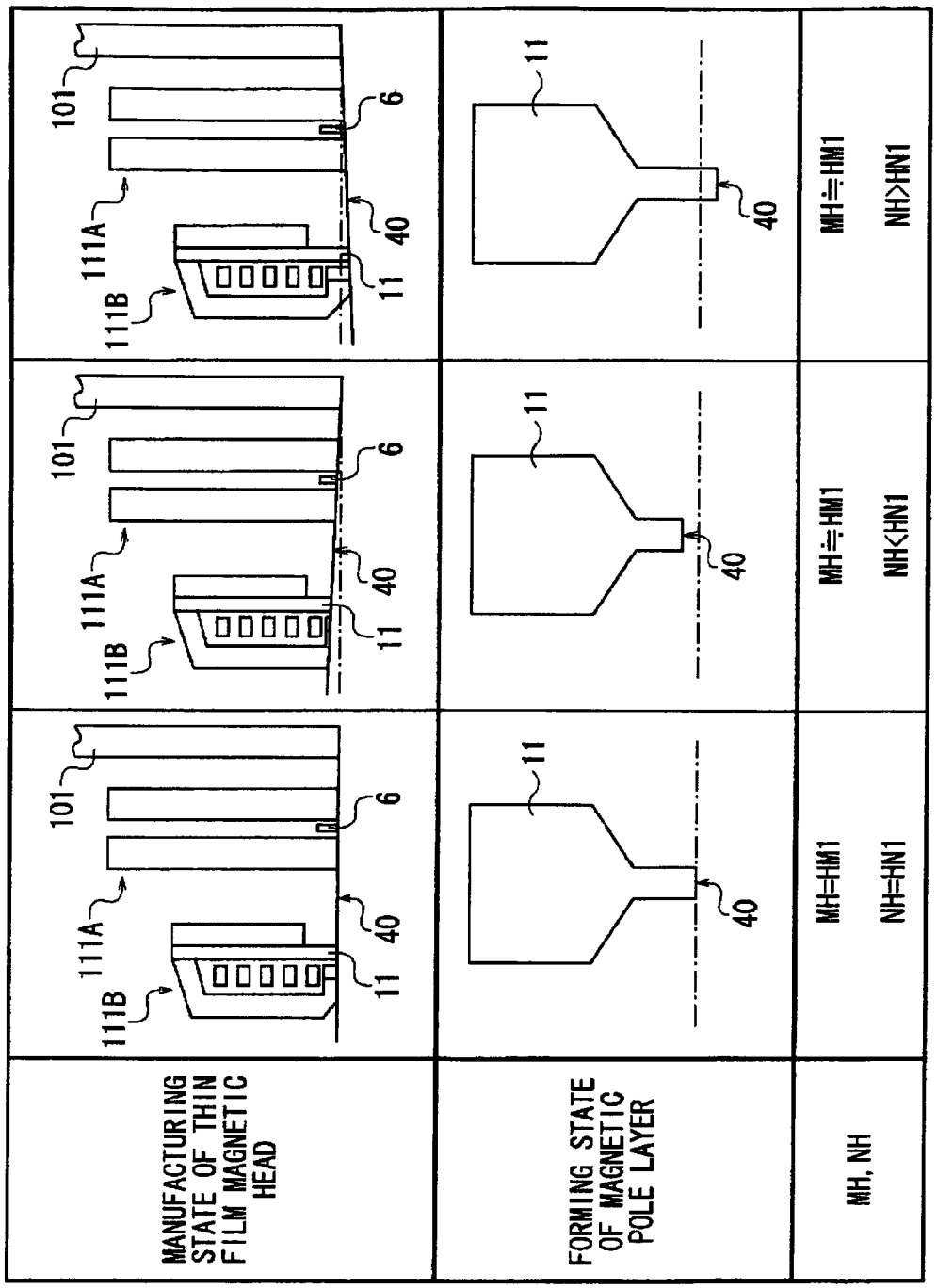
FIGS. 25A to 25C are diagrams for explaining the advantages of the method of manufacturing a thin film magnetic head of the present invention and that of a comparative example.
Figure 26:
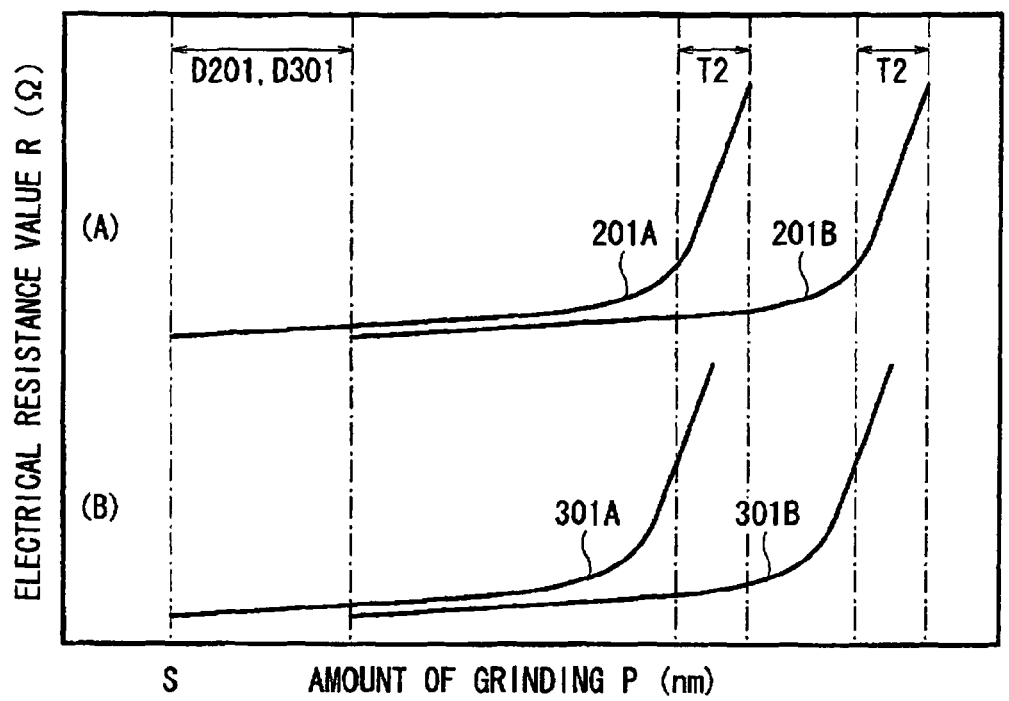
FIG. 26 is diagram illustrating the correlation between the amount of grinding and the electrical resistance values in a method of manufacturing a thin film magnetic head of a comparative example.
Figure 27:
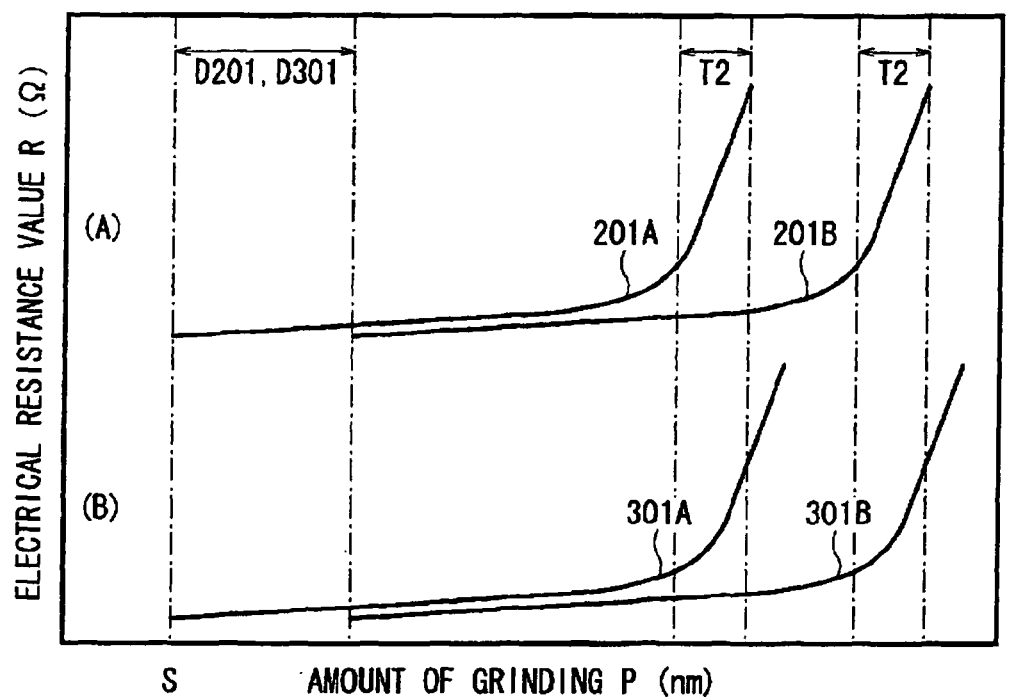
FIG. 27 is diagram illustrating the correlation between the amount of grinding and the electrical resistance values in a method of manufacturing a thin film magnetic head of another comparative example.

The following is a specific description of the effects that can be obtained based on the above-mentioned method of manufacturing a thin film magnetic head. FIGS. 25A to 25C are diagrams to explain the advantages of the method of manufacturing a thin film magnetic head of the present invention. Specifically, FIG. 25A shows the advantages of the method of manufacturing a thin film magnetic head of the present invention. FIGS. 25B and 25C show the problems caused by other methods for manufacturing a thin film magnetic head, as comparative examples of the present invention. FIGS. 26 and 27 show the correlations between the amount of grinding P and the electrical resistance values R in the method of manufacturing a thin film magnetic head of the comparative examples, respectively, each of which shows the correlation corresponding to that in FIG. 24. The methods of the comparative examples have the same manufacturing steps as in the present invention employing both of the RLG sensors 200 for read heads and the RLG sensors 300 for write head core, except that the RLG sensors 300 for write head core are not used and only the RLG sensors 200 for read head core are used. In FIGS. 25A to 25C, the item "the manufacturing state of thin film magnetic head" indicates the side configuration of the thin film magnetic head in the method of manufacturing thin film magnetic head of the present invention and the comparative examples (the side configuration illustrated schematically the sectional configuration in FIG. 21); the item "the forming state of the magnetic pole layer" indicates the plan configuration of the magnetic pole layer (the plan configuration illustrated schematically the plan configuration in FIG. 22); and "MH" and "NH" indicate the MR height MH and the neck height NH. The alternate long and short dash lines in the items of "manufacturing state of thin film magnetic head" and "forming state of magnetic layer" in FIGS. 25A to 25C indicate the desired forming position of the air bearing surface 40.

In the method of manufacturing a thin film magnetic head of the comparative examples employing only the RLG sensors 200 for read head core (refer to FIGS. 25B and 25C), the MR height MH can be determined so as to be substantially the desired size HM1 by manufacturing a thin film magnetic head 110H by grinding the thin film magnetic head bar 600 while controlling the progress of the grinding process with the use of the RLG sensors 200 for read head core. It is however difficult to determine the neck height NH so as to be the desired size HN1. As the example has been discussed above with reference to FIGS. 16 and 17, when the thin film magnetic head bar 600 is inclined when fixed to the fixing jig 700, the grinding surface is inclined due to the inclination of the thin film magnetic head bar 600. Therefore, even when the thin film magnetic head bar 600 is ground so that the MR height MH is the desired size HM1, the neck height NH fails to be the desired size HN1. For example, in the state in which the read head core 111A is ground so that the MR height MH is the desired size HM1, if the write head core 111B is ground excessively, as shown in FIGS. 25B and 26, the air bearing surface 40 is inclined so that the write head core 111B recedes more than the read head core 111A. As a result, the forming length of the magnetic pole layer 11 may be decreased without intention (the resistive film pattern 301 of the RLG sensors 300 for write head is ground excessively than the resistive film pattern 201 of the RLG sensors 200 for read head core), and hence the MR height MH becomes substantially the desired size HM1 (MH=HM1), whereas the neck height NH is shorter than the desired size HN1 (NH<HN1). For example, in the state in which the read head core 111A is ground so that the MR height MH is the desired size HM1, if the amount of grinding to the write head core 111B is insufficient, as shown in FIGS. 25C and 27, the air bearing surface 40 is inclined so that the write head core 111B projects than the read head core 111A. As a result, the forming length of the magnetic pole layer 11 may be increased without intention (the resistive film pattern 201 of the RLG sensors 200 for read head core are ground excessively than the resistive film pattern 301 of the RLG sensors 300 for write head core), and hence the MR height MH becomes substantially the desired size HM1 (MH≈HM1), whereas the neck height NH is longer than the desired size (NH>HN1).

On the other hand, in the method of manufacturing a thin film magnetic head of the present invention using both of the RLG sensors 200 for read head core and the RLG sensors 300 for write head core (refer to FIG. 25A), it is possible to determine the MR height MH so as to achieve the desired size HM1, and determine the neck height NH so as to achieve the desired size HN1 by manufacturing the thin film magnetic head 110H by grinding the thin film magnetic head bar 600 while controlling the progress of the grinding process with the use of the RLG sensors 200 for read head core and the RLG sensors 300 for write head core. This is because, if the thin film magnetic head bar 600 is inclined when fixed to the fixing jig 700, the inclination of the grinding surface of the thin film magnetic head bar 600 can be detected by using both of the RLG sensors 200 for read head core and the RLG sensors 300 for write head core, and the inclination of the grinding surface can be corrected in the course of the grinding (between the pre-grinding process and the finish-polishing process). More specifically, for example, in the state in which the read head core 111A is ground so that the MR height MH is the desired size HM1, the neck height NH of the write head core 11B can also be ground so as to achieve the desired size HN1. As a result, as shown in FIG. 24 and FIG. 25A, an appropriate formation of the air bearing surface 40 permits an appropriate determination of the forming length of the magnetic pole layer 11. That is, the resistive film pattern 201 of the RLG sensors 200 for read head core and the resistive film pattern 301 of the RLG sensors 300 for write head core can be ground to substantially the same degree, so that the MR height MH can be determined so as to be the desired size HM1 (MH=HM1), and the neck height NH can also be determined so as to be the desired size HN1 (NH=HN1). Accordingly, the method of manufacturing the thin film magnetic head of the present invention permits high-precision determinations of the MR height MH and the neck height NH.

In particular, the above-mentioned method of manufacturing a thin film magnetic head has the features that the RLG sensors 200 for read head core (the resistive film pattern 201) is formed so as to include the secondary resistive film pattern 201A that is positioned on the side near the cutting surface 101K1, and the primary resistive film pattern 201B that is positioned on the side far from the cutting surface 101K1 and is partially adjacent to the secondary resistive film pattern 201A; and that the secondary resistive film pattern 201A is used at the time of pre-grinding and adjusting the inclination of the grinding surface, and the primary resistive film pattern 201B is used at the time of finish-polishing. Therefore, as shown in (A) in FIG. 24, the electrical resistance values R1 and R2 can be detected in the grinding state (the range T2) in which the change rate V of the secondary resistive film pattern 201A and that of the primary resistive film pattern 201B become the change rate V2. This improves the sensitivity of detection of both of the electrical resistance values R1 and R2, compared to the case where the RLG sensors 200 for read head core are formed so as to include only one resistive film pattern corresponding to the secondary resistive film pattern 201A, and a common resistive film patter is used at the time of pre-grinding, adjusting the inclination of the grinding surface, and finish-polishing. The reason for this is as follows.

That is, the above-mentioned range T2 (the range of the amount of grinding P in which the change rate V becomes the change rate V2) is extremely narrow as apparent from the correlation in (A) in FIG. 24. Therefore, when the common resistive film pattern is used throughout the pre-grinding, the adjustment of the inclination of the grinding surface, and the finish-polishing, if the grinding condition is set so that the amount of grinding P is in the range T2 at the time of finish-polishing, the amount of grinding P may deviate from the range T2 at the time of grinding and adjustment of the inclination of the grinding surface. On the other hand, if the grinding condition is set so that the amount of grinding P is in the range T2 at the time of pre-grinding and the adjustment of the inclination of the grinding surface, the amount of grinding P at the time of finish-polishing may deviate from the range T2. Thus, from the point of view of this, it is capable of contributing to the high-precision determinations of the MR height MH and the neck height NH.

In particular, when only one resistive film pattern is used as described above, if the grinding condition is set so that the amount of grinding P is in the range T2 at the time of pre-grinding and adjusting the inclination of the grinding surface, the electrical resistance values R1 and R2 can be detected in the state of an appropriate resistance value (the state in which the sensitivity of detection of resistances is appropriate), thus enabling the electrical resistance values R1 and R2 to be detected with high precision. On the other hand, the electrical resistance values R1 are detected in the state in which the resistance values are infinitely increased (the state in which the sensitivity of detection of resistance is excessively large), making it difficult to detect the electrical resistance values R1 themselves. It is therefore difficult to perform a finish-polishing based on the electrical resistance values R1, and to detect the termination of the finish-polishing process. On the other hand, if the grinding condition is set so that the amount of grinding P is in the range T2 at the time of finish-polishing, the electrical resistance values R1 have to be detected in the state in which resistance variation is considerably small (the state in which the sensitivity of detection of resistance is extremely small, namely the range T1), and hence the precision of detection of the electrical resistance values R1 may be lowered.

The technical significance of the above-mentioned method of manufacturing a thin film magnetic head will be described for confirmation. For example, in order to set the final neck height NH to be a desired value ±0.03 μm when the distance between the read head core 111A (the MR element 6) and the write head core 111B (the seed layer 10) is 6 μm, it is necessary to set the angle of inclination of the grinding surface be a desired value ±0.3°. This angle of inclination can be calculated from the size changes (height changes) of the resistive film sensors 201 and 301 that are detected based on the changes in the resistance values by using the RLG sensors 200 for read head core and the RLG sensors 300 for write head core. Hence, the accuracy of calculation of the angle of inclination depends on the accuracy of detection of the sizes of the resistive film sensors 201 and 301. Further, the above-mentioned resistance values are normally measured with a prober, and hence there is a limit on improvements in accuracy of measurements of resistance values based on this resistance measuring method. Consequently, in order to improve the precision of detection of the sizes of the resistive film sensors 201 and 301, it is effective to measure the electrical resistance value R of each of the resistive film sensors 201 and 301 in the range T2 in which the change rate V is the change rate V2 larger than the change rate V1, as shown in FIGS. 4C and FIG. 24.

Additionally, in the method of manufacturing a thin film magnetic head, the thin film magnetic head bar 600 is pre-ground (rough-ground) by using the RLG sensors 200 for read head core, and the inclination of the grinding surface of the thin film magnetic head bar 600 is adjusted by using both of the RLG sensors 200 for read head core and the RLG sensors 300 for write head core, and the thin film magnetic head bar 600 is finish-polished (fine-ground) by using the RLG sensors 200 for read head. That is, the above-mentioned rough grinding process allows the thin film magnetic head bar 600 to be ground in a relatively large amount of grinding in a short period of time, and the finish-polishing process allows the thin film magnetic head bar 600 to be ground with high precision in a relatively small amount of grinding. Accordingly, when the thin film magnetic head 110H is manufactured by forming the air bearing surface 40 by grinding the thin film magnetic head bar 600, the thin film magnetic head bar 600 can be manufactured with high precision in a short period of time.

Although in the above-mentioned method of manufacturing a thin film magnetic head, the RLG sensors 200 for read head core are used to pre-grind the thin film magnetic head bar 600, and the RLG sensors 200 are used again to finish-polish the thin film magnetic head bar 600, without limiting to this, the type of the RLG sensor used for pre-grinding and finish-polishing can be changed freely as long as it is possible to form the thin film magnetic head 110H so that both of the MR height MH and the neck height NH can be determined with high precision. For example, instead of the RLG sensors 200 for read head core, the RLG sensors 300 for write head core, alternately, both RLG sensors 200 and 300 may be used to perform pre-grinding and finish-polishing.

It is to be understood that the present invention should not be limited to the foregoing preferred embodiment but is susceptible of various changes and modifications based on the concept of the present invention, which may be considered as coming within the scope of the present invention as claimed in the appended claims. Although the foregoing embodiment discussed the case where the present invention is applied to the shield type head, it may be applied to a single pole head. It is of course possible to apply the present invention to a thin film magnetic head having a structure that the read head cores and the write head cores are laminated vice versa.

Figure 28:
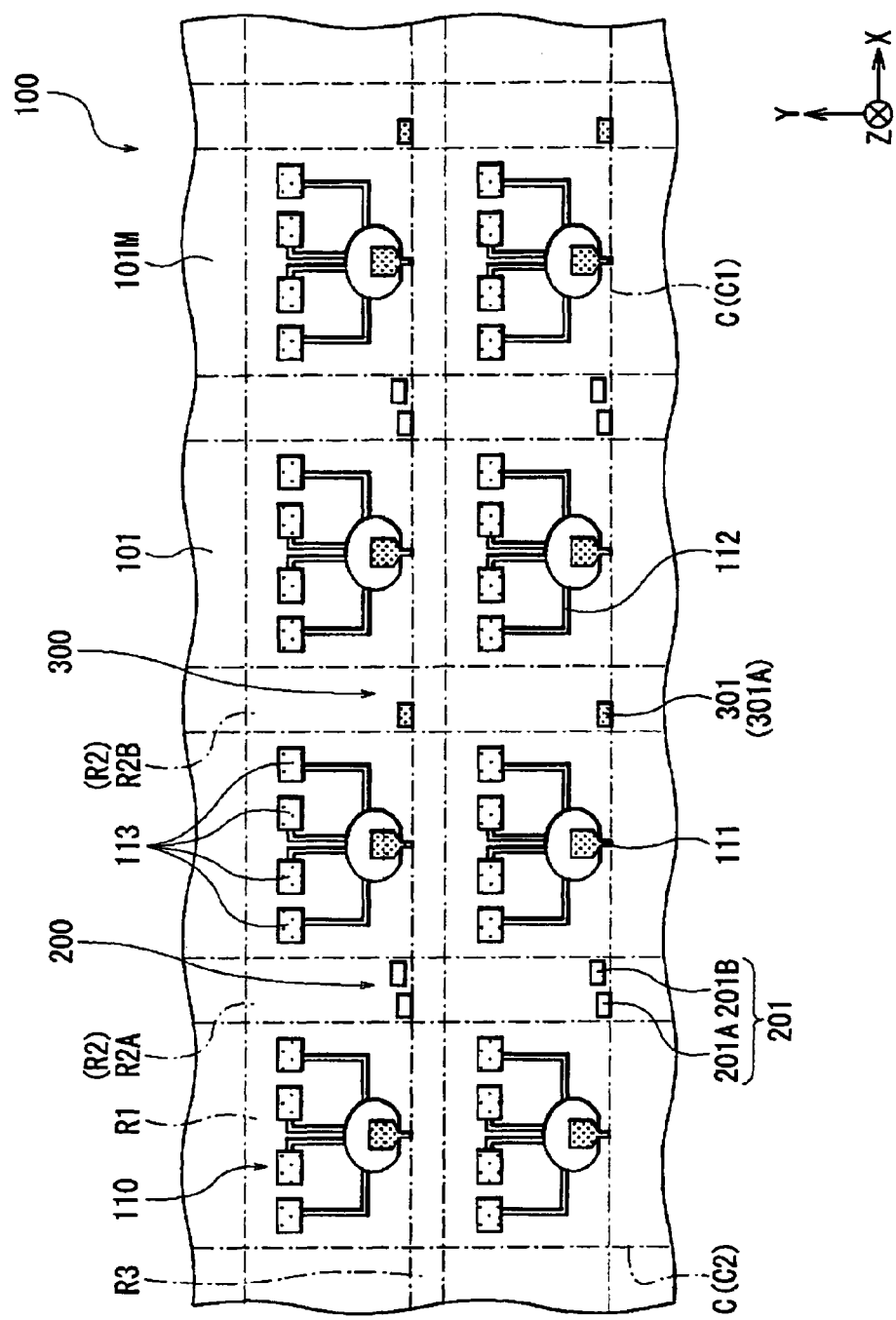
FIG. 28 is a plan view illustrating a modification in the configuration of the thin film magnetic head integrated structure of an embodiment.
Figure 29:
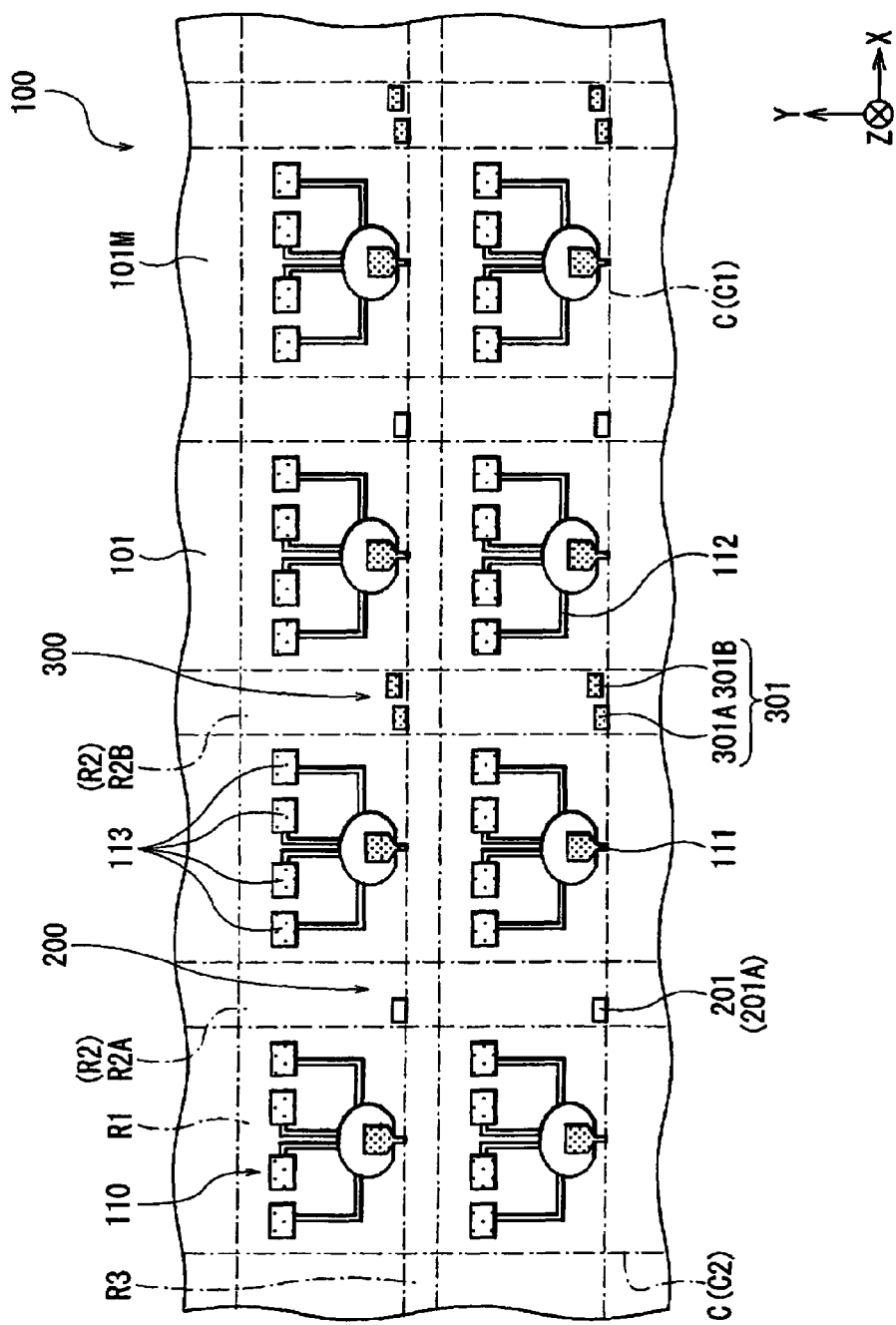
FIG. 29 is a plan view illustrating another modification in the configuration of the thin film magnetic head integrated structure of an embodiment.

In particular, in the above embodiment, the thin film magnetic head integrated structure 100 is formed so that the RLG sensors 200 for read head core (the resistive film pattern 201) include both of the secondary resistive film pattern 201A and the primary resistive film pattern 201B, and the RLG sensors 300 for write head core (the resistive film pattern 301) include both of the secondary resistive film pattern 301A and the primary resistive film pattern 301B, as shown in FIGS. 1 and 2. Instead of this configuration, the thin film magnetic head integrated structure 100 may be formed as follows. In an alternative, as shown in FIG. 28 corresponding to FIG. 2, the RLG sensors 200 for read head core may include both of the secondary resistive film pattern 201A and the primary resistive film pattern 201B, and the RLG sensors 300 for write head core may contain only the secondary resistive film pattern 301A. In another alternative, as shown in FIG. 29 corresponding to FIG. 2, the RLG sensors 200 for read head core may include only the secondary resistive film pattern 201A, and the RLG sensors 300 for write head core may include both of the secondary resistive film pattern 301A and the primary resistive film pattern 301B. When using the thin film magnetic head integrated structure 100 as shown in FIG. 28, the RLG sensors 200 for read head core (the secondary resistive film pattern 201A) can be used to perform pre-grinding, and the RLG sensors 200 for read head core (the secondary resistive film pattern 201A) and RLG sensors 300 for write head core (the secondary resistive film pattern 301A) can be used to adjust the inclination of the grinding surface, and then the RLG sensors 200 for read head core (the secondary resistive film pattern 301A) can be used to perform finish-polishing, in the same manner as the case of using the thin film magnetic head integrated structure 100 as shown in FIGS. 1 and 2. On the other hand, When using the thin film magnetic head integrated structure 100 as shown in FIG. 29, the RLG sensors 200 for read head core (the secondary resistive film pattern 201A) can be used to perform pre-grinding, and the RLG sensors 200 for read head core (the secondary resistive film pattern 201A) and RLG sensors 300 for write head core (the secondary resistive film pattern 301A) can be used to adjust the inclination of the grinding surface, and then the RLG sensors 300 for write head core (the primary resistive film pattern 301A) can be used to perform finish-polishing. In these cases, the same effect as the foregoing preferred embodiment can be obtained. The thin film magnetic head integrated structures 100 shown in FIGS. 28 and 29 are the same as that shown in FIG. 2, except for the above-mentioned configurations, respectively.

In the foregoing embodiment, the RLG sensors 200 for read head core and the RLG sensors 300 for write head core are formed so as to include two resistive film sensors (the secondary resistive film sensors 201A and 301A, or the primary-resistive film sensors 201B and 301B), which recede sequentially from the side that becomes the air bearing surface (the side near the cutting line C1) as shown in FIG. 2. Without limiting to this, the number and the arrangement relationship of the resistive film sensors included in the RLG sensors 200 for read head core and the RLG sensors 300 for write head core can be changed freely as long as it is possible to maintain the arrangement relationship of receding sequentially from the side that becomes the air bearing surface, as described above.

Although the foregoing embodiment discussed the case where the present invention is applied to the thin film magnetic head of perpendicular recording system, without limiting to this, the present invention is applicable to a thin film magnetic head of longitudinal recording system.

For example, the thin film magnetic head integrated structure and the method of manufacturing thereof are applicable to a method of manufacturing a thin film magnetic head that is mounted on a magnetic recording device such as a hard disk drive that magnetically writes information in a hard disk.

It should be understood by those skilled in the art that various modifications, combinations, sub-combinations and alterations may occur depending on design requirements and other factors insofar as they are within the scope of the appended claims or the equivalents thereof.

What is claimed is:

1. A thin film magnetic head integrated structure comprising, on one surface of a substrate:
   a plurality of thin film magnetic head precursors each having a read head core and a write head core stacked one upon another, the read head core including a magnetoresistive element that performs a read process and the write head core including a magnetic pole layer that performs a write process by a track-width-defining part for defining a track width, the plurality of thin film magnetic head precursors being provided prior to formation of a plurality of thin film magnetic heads each including the read head core and the write head core and each having an air bearing surface defining an air bearing surface position;

a plurality of resistive film sensors for the read head cores, arranged in the same layer as the magnetoresistive element, that control a grinding progress on the read head cores when grinding the thin film magnetic head precursors from grinding start surface positions of respective read head cores to the air bearing surface positions of the respective read head cores by being ground together with the read head cores; and a plurality of resistive film sensors for the write head cores, arranged in the same layer as the magnetic pole layer, that control a grinding progress on the write head cores when grinding the thin film magnetic head precursors from grinding start surface positions of respective write head cores to the air bearing surface positions of the respective write head cores by being ground together with the write head cores, wherein an amount of grinding of the read head cores based on changes in electrical resistance value responsive to the amount of grinding of the resistive film sensors for the read head cores is detected, and an amount of grinding of the write head cores based on changes in electrical resistance value responsive to the amount of grinding of the resistive film sensors for the write head cores is detected, and each of the resistive film sensors for the read head cores and each of the resistive film sensors for the write head cores include a first resistive film pattern which is arranged so as to be in line with the grinding start surface positions, and at least one of the resistive film sensors for the read head cores and the resistive film sensors for the write head cores includes a second resistive film pattern which is receded from the grinding start surface positions and arranged so as to be partially adjacent to the first resistive film pattern, wherein, in each of the at least one of the resistive film sensors for the read head cores and the resistive film sensors for the write head cores, the first resistive film pattern and the second resistive film pattern are physically and electrically separated from each other, the first resistive pattern is used to pre-grind the thin film magnetic head precursors until sizes of the magnetoresistive element and the track-width-defining part reach a pre-size larger than a desired size, the first resistive pattern and the second resistive pattern are used to adjust an inclination of the thin film magnetic head precursor by maintaining the pre-size, and the second resistive pattern is used to finish-polish the thin film magnetic head precursors until sizes of the magnetoresistive element and the track-width-defining part are changed from the pre-size to the desired size.

2. The thin film magnetic head integrated structure according to claim 1, wherein each of the resistive film sensors for the read head cores and each of the resistive film sensors for the write head cores includes both of the first resistive film pattern and the second resistive film pattern.

3. The thin film magnetic head integrated structure according to claim 1,
wherein each of the resistive film sensors for the read head cores includes both of the first resistive film pattern and the second resistive film pattern, and
each of the resistive film sensors for the write head cores includes only the first resistive film pattern.

4. The thin film magnetic head integrated structure according to claim 1,
wherein each of the resistive film sensors for the read head cores includes only the first resistive film pattern, and
each of the resistive film sensors for the write head cores includes both of the first resistive film pattern and the second resistive film pattern.

5. The thin film magnetic head integrated structure according to claim 1,
wherein the plurality of thin film magnetic head precursors are arranged in a plurality of columns, and
the plurality of resistive film sensors for the read head cores and the plurality of resistive film sensors for the write head cores are arranged in a plurality of columns corresponding to a direction of arrangement of the plurality of thin film magnetic head precursors.

6. The thin film magnetic head integrated structure according to claim 1,
wherein the thin film magnetic head precursors are arranged in a first region, and
the resistive film sensors for the read head cores and the resistive film sensors for the write head cores are arranged in a second region different from the first region.

7. The thin film magnetic head integrated structure according to claim 1, wherein the write head cores perform a perpendicular write process.

* * * * *